United States Patent
Pawsey

(10) Patent No.: US 12,434,048 B2
(45) Date of Patent: Oct. 7, 2025

(54) IMPLANTABLE STIMULATING ASSEMBLY

(71) Applicant: Cochlear Limited, Macquarie University (AU)

(72) Inventor: Nicholas Charles Pawsey, Macquarie University (AU)

(73) Assignee: Cochlear Limited, Macquarie University (AU)

( * ) Notice: Subject to any disclaimer, the term of this patent is extended or adjusted under 35 U.S.C. 154(b) by 665 days.

(21) Appl. No.: 15/337,326

(22) Filed: Oct. 28, 2016

(65) Prior Publication Data

US 2017/0120044 A1  May 4, 2017

Related U.S. Application Data

(60) Provisional application No. 62/248,637, filed on Oct. 30, 2015.

(51) Int. Cl.
*A61N 1/05* (2006.01)

(52) U.S. Cl.
CPC ................. *A61N 1/0541* (2013.01)

(58) Field of Classification Search
CPC .............. A61N 1/0541; A61N 1/36036; A61N 1/36038; A61N 2005/0605
See application file for complete search history.

(56) References Cited

U.S. PATENT DOCUMENTS

| | | | |
|---|---|---|---|
| 4,242,709 A * | 12/1980 | Stricker | |
| 7,269,461 B2 * | 9/2007 | Dadd | A61N 1/0541 607/137 |
| 7,315,763 B2 * | 1/2008 | Kuzma | A61N 1/0541 607/137 |
| 8,785,507 B2 | 7/2014 | Bloomfield | |
| 9,402,990 B2 * | 8/2016 | Gibson | A61N 1/372 |
| 2004/0116995 A1 * | 6/2004 | Dadd | A61N 1/0541 607/137 |
| 2004/0127968 A1 * | 7/2004 | Kuzma | A61N 1/0541 607/137 |
| 2004/0249417 A1 * | 12/2004 | Ransbury | A61N 1/375 607/4 |
| 2009/0023976 A1 | 1/2009 | Cho et al. | |
| 2012/0004715 A1 | 1/2012 | Ramachandran et al. | |

(Continued)

FOREIGN PATENT DOCUMENTS

KR    100859979 B1    9/2008

OTHER PUBLICATIONS

International Search Report and Written Opinion for PCT/IB2016/056536, mailed Jan. 26, 2017.

(Continued)

*Primary Examiner* — Tammie K Marlen
(74) *Attorney, Agent, or Firm* — Pilloff Passino & Cosenza LLP; Martin J. Cosenza

(57) ABSTRACT

An electrode array, including a plurality of electrodes, and an electrode carrier carrying the plurality of electrodes, wherein the electrode carrier is made of a viscoelastic material, such as by way of example, a viscoelastic silicone, wherein in some embodiments, the electrode carrier is devoid of non-viscoelastic silicone. In an exemplary embodiment, the electrode carrier is configured to recover to a curved, unrestrained and relaxed state, from a substantially straight state in no less than thirty seconds.

24 Claims, 18 Drawing Sheets

(56) References Cited

U.S. PATENT DOCUMENTS

| | | |
|---|---|---|
| 2012/0329896 A1 | 12/2012 | Bloomfield |
| 2013/0218124 A1* | 8/2013 | Imran ............... A61M 37/0069 |
| | | 604/500 |
| 2013/0253086 A1 | 9/2013 | Wilson et al. |
| 2014/0094892 A1 | 4/2014 | Thenuwara et al. |
| 2015/0094793 A1 | 4/2015 | Svehla |
| 2015/0119967 A1* | 4/2015 | Pawsey ............. A61N 1/36036 |
| | | 607/137 |

OTHER PUBLICATIONS

Marc Behl et al., "Shape-memory polymers," Materials Today, Apr. 2007, pp. 20-28, vol. 10, No. 4, Elsevier Ltd.

Xuelian Wu et al., "Mechanisms of the Shape Memory Effect in Polymeric Materials," Polymers, Sep. 30, 2013, pp. 1,169-1,202, vol. 5, No. 4.

C. Liu et al., "Review of progress in shape-memory polymers," Journal of Materials Chemistry, Mar. 19, 2007, pp. 1,543-1,558, Issue 16.

* cited by examiner

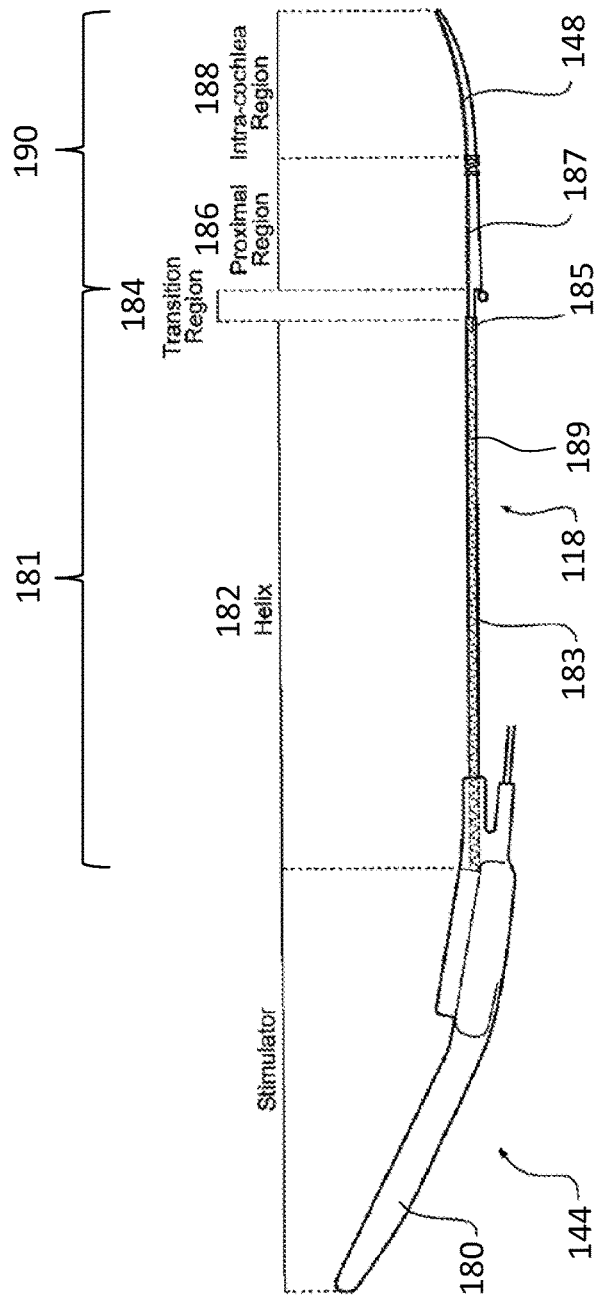
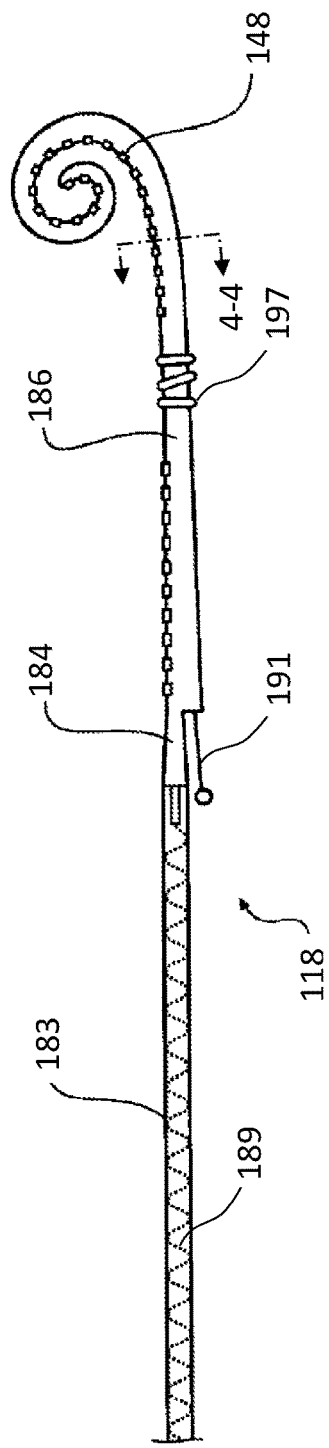
FIG. 1B
FIG. 2

IMPLANTABLE STIMULATING ASSEMBLY

CROSS-REFERENCE TO RELATED APPLICATIONS

This application claims priority to Provisional U.S. Patent Application No. 62/248,637, entitled IMPLANTABLE STIMULATING ASSEMBLY, filed on Oct. 30, 2015, naming Nicholas Charles PAWSEY of Australia, as an inventor, the entire contents of that application being incorporated herein by reference in its entirety.

BACKGROUND

Hearing loss, which may be due to many different causes, is generally of two types: conductive and sensorineural. Sensorineural hearing loss is due to the absence or destruction of the hair cells in the cochlea that transduce sound signals into nerve impulses. Various hearing prostheses are commercially available to provide individuals suffering from sensorineural hearing loss with the ability to perceive sound. One example of a hearing prosthesis is a cochlear implant.

Conductive hearing loss occurs when the normal mechanical pathways that provide sound to hair cells in the cochlea are impeded, for example, by damage to the ossicular chain or the ear canal. Individuals suffering from conductive hearing loss may retain some form of residual hearing because the hair cells in the cochlea may remain undamaged.

Individuals suffering from conductive hearing loss typically receive an acoustic hearing aid. Hearing aids rely on principles of air conduction to transmit acoustic signals to the cochlea. In particular, a hearing aid typically uses an arrangement positioned in the recipient's ear canal or on the outer ear to amplify a sound received by the outer ear of the recipient. This amplified sound reaches the cochlea causing motion of the perilymph and stimulation of the auditory nerve.

In contrast to hearing aids, which rely primarily on the principles of air conduction, certain types of hearing prostheses commonly referred to as cochlear implants convert a received sound into electrical stimulation. The electrical stimulation is applied to the cochlea, which results in the perception of the received sound.

SUMMARY

In an exemplary embodiment, there is an electrode array, comprising a plurality of electrodes, and an electrode carrier carrying the plurality of electrodes, wherein the electrode carrier is made of a viscoelastic material.

In an exemplary embodiment, there is a method, comprising obtaining an implantable component, and inserting the implantable component into a recipient, wherein subsequent to the full insertion of the implantable component, the implantable component transforms from a first geometry to a second geometry without external force relief, external pressure relief, reaction force, mass transfer and net energy transfer inducing the transformation.

According to another exemplary embodiment, there is a method, comprising obtaining a curved electrode array assembly, inserting a first portion of the electrode array assembly into a cochlea of a human in a deformed state that is deformed from a relaxed, unrestrained state of the electrode array assembly such that the first portion corresponds to a portion of the electrode array assembly extending a first distance of the electrode array assembly starting from a tip of the electrode array to a location proximal of the tip that is located in the cochlea, and the portion of the electrode array making up the first distance is inserted at a first angular depth into the cochlea, wherein the first portion of the electrode array assembly achieves a second angular insertion depth greater than the first angular insertion depth after the first portion making up the first distance is located in the cochlea.

According to another exemplary embodiment, there is an electrode array including a main body carrying electrodes, wherein the main body is configured to elastically expand in a radial direction relative to a longitudinal axis thereof after insertion into a recipient without any mass transfer into the portions of the main body that expanded, wherein the main body is configured such that the main body is expandable from a compressed diameter lying normal to the longitudinal axis, beginning at a time of full compression relief, to a diameter of at least 1.5 times the compressed diameter within a time period of no less than about 30 seconds from full compression relief.

BRIEF DESCRIPTION OF THE DRAWINGS

Embodiments of the present invention are described below with reference to the attached drawings, in which:

FIG. 1B is a side view of the implantable components of the cochlear implant illustrated in FIG. 1A;

FIG. 2 is a side view of an embodiment of the electrode array illustrated in FIGS. 1A and 1B in a curled orientation;

DETAILED DESCRIPTION

Figure 1A:
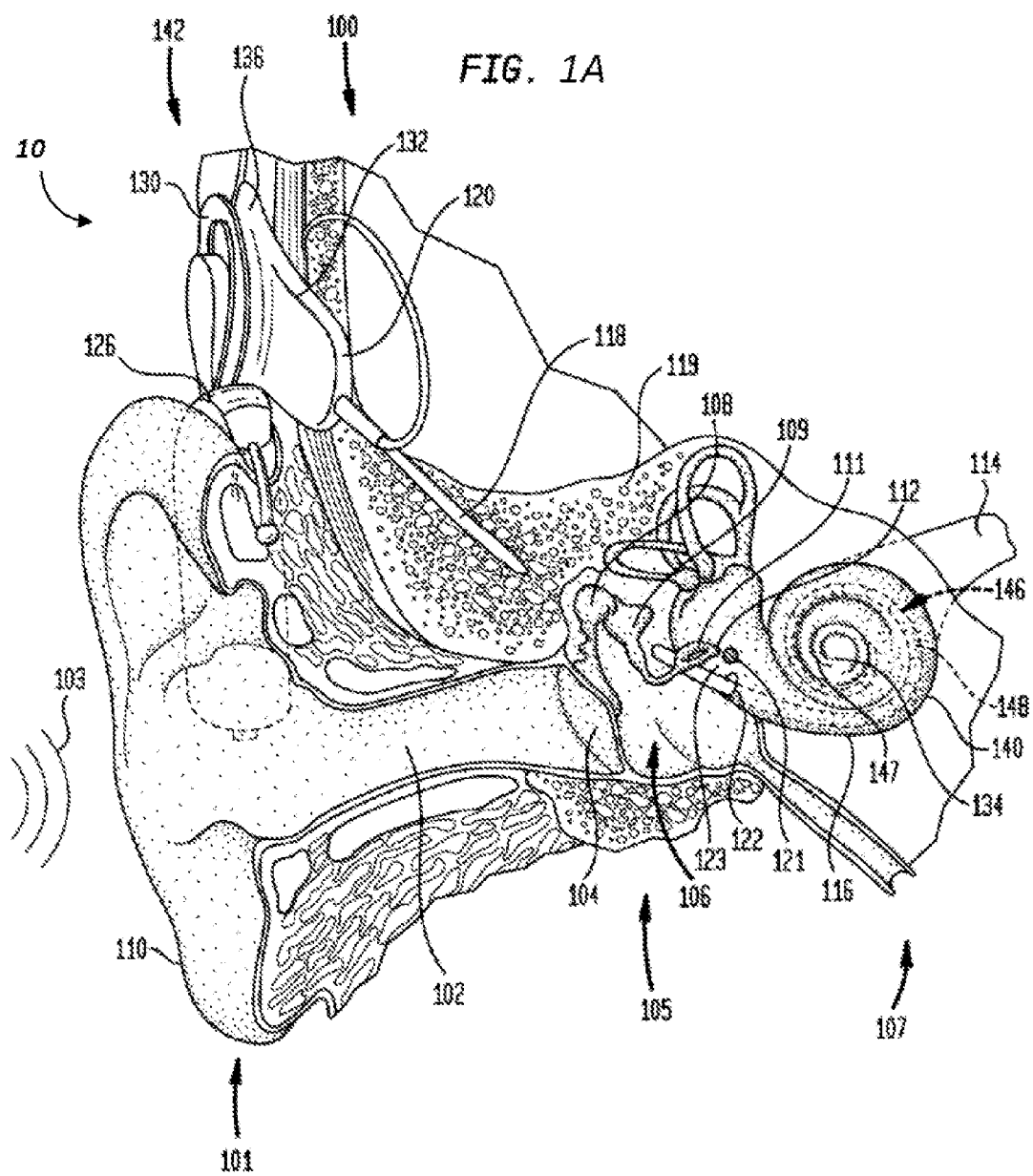
FIG. 1A is a perspective view of an exemplary hearing prosthesis utilized in some exemplary embodiments.

FIG. 1A is a perspective view of a totally implantable cochlear implant according to an exemplary embodiment, referred to as cochlear implant 100, implanted in a recipient. The cochlear implant 100 is part of a system 10 that can include external components, as will be detailed below.

In an alternate embodiment, the cochlear implant system is not a totally implantable system. By way of example, the cochlear implant system includes an external component that includes a microphone and a sound processor. The sound processor processes signals from the microphone, and generates a signal that is transmitted transcutaneously to an implantable component which then uses the signal to stimulate tissue and evoke a hearing percept.

It is noted that in some conventional parlances, the entire system 10 is referred to as a cochlear implant, especially in the case of a cochlear implant that is not totally implantable. Herein, the phrase cochlear implant refers to the implantable component, and the phrase cochlear implant system refers to the entire system 10. That is, the phrase cochlear implant corresponds to the implantable component of a non-totally implantable cochlear implant system.

The recipient has an outer ear 101, a middle ear 105 and an inner ear 107. Components of outer ear 101, middle ear 105 and inner ear 107 are described below, followed by a description of cochlear implant 100.

In a fully functional ear, outer ear 101 comprises an auricle 110 and an ear canal 102. An acoustic pressure or sound wave 103 is collected by auricle 110 and channeled into and through ear canal 102. Disposed across the distal end of ear canal 102 is a tympanic membrane 104 which vibrates in response to sound wave 103. This vibration is coupled to oval window or fenestra ovalis 112 through three bones of middle ear 105, collectively referred to as the ossicles 106 and comprising the malleus 108, the incus 109 and the stapes 111. Bones 108, 109, and 111 of middle ear 105 serve to filter and amplify sound wave 103, causing oval window 112 to articulate, or vibrate in response to vibration of tympanic membrane 104. This vibration sets up waves of fluid motion of the perilymph within cochlea 140. Such fluid motion, in turn, activates tiny hair cells (not shown) inside of cochlea 140. Activation of the hair cells causes appropriate nerve impulses to be generated and transferred through the spiral ganglion cells (not shown) and auditory nerve 114 to the brain (also not shown) where they are perceived as sound.

As shown, cochlear implant 100 comprises one or more components which are temporarily or permanently implanted in the recipient. Cochlear implant 100 is shown in FIG. 1A with an external device 142, that is part of system 10 (along with cochlear implant 100), which, as described below, is configured to provide power to the cochlear implant.

In the illustrative arrangement of FIG. 1A, external device 142 may comprise a power source (not shown) disposed in a Behind-The-Ear (BTE) unit 126. External device 142 also includes components of a transcutaneous energy transfer link, referred to as an external energy transfer assembly. The transcutaneous energy transfer link is used to transfer power and/or data to cochlear implant 100. Various types of energy transfer, such as infrared (IR), electromagnetic, capacitive and inductive transfer, may be used to transfer the power and/or data from external device 142 to cochlear implant 100. In the illustrative embodiments of FIG. 1A, the external energy transfer assembly comprises an external coil 130 that forms part of an inductive radio frequency (RF) communication link. External coil 130 is typically a wire antenna coil comprised of multiple turns of electrically insulated single-strand/or multi-strand platinum or gold wire. External device 142 also includes a magnet (not shown) positioned within the turns of wire of external coil 130. It should be appreciated that the external device shown in FIG. 1A is merely illustrative, and other external devices may be used with embodiments of the present invention.

Cochlear implant 100 comprises an internal energy transfer assembly 132 which may be positioned in a recess of the temporal bone adjacent auricle 110 of the recipient. As detailed below, internal energy transfer assembly 132 is a component of the transcutaneous energy transfer link and receives power and/or data from external device 142. In the illustrative embodiment, the energy transfer link comprises an inductive RF link, and internal energy transfer assembly 132 comprises a primary internal coil 136. Internal coil 136 is typically a wire antenna coil comprised of multiple turns of electrically insulated single-strand/or multi-strand platinum or gold wire.

Cochlear implant 100 further comprises a main implantable component 120 and an elongate stimulating assembly 118. In embodiments of the present invention, internal energy transfer assembly 132 and main implantable component 120 are hermetically sealed within a biocompatible housing. In embodiments of the present invention, main implantable component 120 includes a sound processing unit (not shown) to convert the sound signals received by the implantable microphone in internal energy transfer assembly 132 to data signals. Main implantable component 120 further includes a stimulator unit (also not shown) which generates electrical stimulation signals based on the data signals. The electrical stimulation signals are delivered to the recipient via elongate stimulating assembly 118.

Elongate stimulating assembly 118 has a proximal end connected to main implantable component 120, and a distal end implanted in cochlea 140. Stimulating assembly 118 extends from main implantable component 120 to cochlea 140 through mastoid bone 119. In some embodiments stimulating assembly 118 may be implanted at least in basal region 116, and sometimes further. For example, stimulating assembly 118 may extend towards apical end of cochlea 140, referred to as cochlea apex 134. In certain circumstances, stimulating assembly 118 may be inserted into cochlea 140 via a cochleostomy 122. In other circumstances, a cochleostomy may be formed through round window 121, oval window 112, the promontory 123, or through an apical turn 147 of cochlea 140.

Stimulating assembly 118 comprises a longitudinally aligned and distally extending array 146 of electrodes 148, disposed along a length thereof. As noted, a stimulator unit generates stimulation signals which are applied by stimulating contacts 148, which in an exemplary embodiment are electrodes, to cochlea 140, thereby stimulating auditory nerve 114. In an exemplary embodiment, stimulation contacts can be any type of component that stimulates the cochlea (e.g., mechanical components, such as piezoelectric devices that move or vibrate, thus stimulating the cochlea (e.g., by inducing movement of the fluid in the cochlea), electrodes that apply current to the cochlea, etc.). Embodiments detailed herein will generally be described in terms of a stimulating assembly 118 utilizing electrodes as elements 148. It is noted that alternate embodiments can utilize other types of stimulating devices. Any device, system, or method of stimulating the cochlea can be utilized in at least some embodiments.

As noted, cochlear implant 100 comprises a totally implantable prosthesis that is capable of operating, at least for a period of time, without the need for external device 142. Therefore, cochlear implant 100 further comprises a rechargeable power source (not shown) that stores power received from external device 142. The power source may comprise, for example, a rechargeable battery. During operation of cochlear implant 100, the power stored by the power source is distributed to the various other implanted components as needed. The power source may be located in main implantable component 120, or disposed in a separate implanted location.

It is noted that the teachings detailed herein and/or variations thereof can be utilized with a non-totally implantable prosthesis. That is, in an alternate embodiment of the cochlear implant 100, the cochlear implant 100, and thus system 10, is a traditional hearing prosthesis.

While various aspects of the present invention are described with reference to a cochlear implant (whether it be a device utilizing electrodes or stimulating contacts that impart vibration and/or mechanical fluid movement within the cochlea), it will be understood that various aspects of the embodiments detailed herein are equally applicable to other stimulating medical devices having an array of electrical simulating electrodes such as auditory brain implant (ABI), functional electrical stimulation (FES), spinal cord stimulation (SCS), penetrating ABI electrodes (PABI), and so on. Also, while embodiments disclosed herein are directed to electrodes, it is noted that in other embodiments, the teachings detailed herein are applicable to non-electrical stimulation, such as by way of example only and not by way of limitation, optical stimulation, magnetic stimulation, etc. Indeed, in an exemplary embodiment, instead of or in addition to electrodes, induction coils are utilized to stimulate the tissue (e.g., the tissue inside the cochlea). Moreover, it is noted that embodiments disclosed herein are not limited to application to hearing prostheses. For example, the teachings detailed herein can be applicable to retinal stimulation, skin stimulation, etc. Note further that the teachings detailed herein are applicable to deep brain stimulation, and thus an exemplary embodiment includes a deep brain stimulator assembly utilizing the teachings detailed herein. Further, it is noted that the teachings herein are applicable to stimulating medical devices having electrical stimulating electrodes of all types such as straight electrodes, perimodiolar electrodes and short/basal electrodes. Also, various aspects of the embodiments detailed herein and/or variations thereof are applicable to devices that are non-stimulating and/or have functionality different from stimulating tissue, such as for example, any intra-body dynamic phenomenon (e.g., pressure, or other phenomenon consistent with the teachings detailed herein) measurement/sensing, etc., which can include use of these teachings to sense or otherwise detect a phenomenon at a location other than the cochlea (e.g., within a cavity containing the brain, the heart, etc.). Additional embodiments are applicable to bone conduction devices, Direct Acoustic Cochlear Stimulators/Middle Ear Prostheses, and conventional acoustic hearing aids. Any device, system, or method of evoking a hearing percept can be used in conjunction with the teachings detailed herein. The teachings detailed herein are applicable to any device, system, or method where an elongate lead having elastic properties or the like has utilitarian value with respect to positioning thereof.

Still focusing on a cochlear implant, FIG. 1B is a side view of the cochlear implant 100 without the other components of system 10 (e.g., the external components). Cochlear implant 100 comprises a receiver/stimulator 180 (combination of main implantable component 120 and internal energy transfer assembly 132) and an elongate stimulating assembly 118. Stimulating assembly 118 includes a helix region 182 that includes a body 183 in which is embedded (e.g., in the case where the body is silicone or another biocompatible material molded around wire leads) or otherwise containing (e.g., in the case where the body is a conduit or tube) electrical lead wires 189 in a helix (more on this below), a transition region 184 (which can be part of the body 183), a proximal region 186, and an intra-cochlear region 188. The proximal region 186, in this embodiment, is connected to the transition region 184 via a distinct connection 185, although in other embodiments, the transition region is blended into the helix region 182 (and the proximal region 186). Proximal region 186 and intra-cochlear region 188 form an electrode array 190. The portion of the stimulating assembly 118 that extends from the receiver/stimulator 180 to the electrode array 190 is referred to herein as the lead assembly, indicated by reference numeral 181 in FIG. 1A. In an exemplary embodiment, proximal region 186 is located in the middle-ear cavity of the recipient after implantation of the intra-cochlear region 188 into the cochlea. Thus, proximal region 186 corresponds to a middle-ear cavity sub-section of the stimulating assembly 118. In some exemplary embodiments, nubs 187 are provided on the outer surface of the proximal region to aid in the manipulation of the electrode array assembly 190 during insertion of the intra-cochlear region into the cochlea. Electrode array assembly 190, and in particular, intra-cochlear region 188 of electrode array assembly 190, supports a plurality of electrode contacts 148. These electrode contacts 148 are each connected to a respective conductive pathway, such as wires, PCB traces, etc. (not shown) which are connected to receiver/stimulator 180, through which respective stimulating electrical signals for each electrode contact 148 travel.

It is noted that in some embodiments, the helix region 182 does not extend as far as that depicted in FIG. 1A, and the transition region 184 is thus longer. That is, in some exemplary embodiments, the helix region 182 does not extend substantially the full length between the receiver/stimulator 180 and the proximal region 186, but instead extends less than that (e.g., about half the distance), where the remaining distance is established by substantially straight lead wires, or at least wires that are not substantially helixed. Any arrangement of lead wires that can enable the teachings detailed herein and/or variations thereof to be practiced can be utilized in some exemplary embodiments.

FIG. 2 is a side view of a portion of stimulating assembly 118 where the electrode array of the electrode array assembly 190 is in a curled orientation, as it would be when inserted in a recipient's cochlea, with electrode contacts 148 located on the inside of the curve.

It is noted that FIGS. 1B and 2 can be, by way of example only and not by way of limitation, a perimodiolar stimulating assembly or a mid-scala assembly which assumes a mid-scala position during or following implantation.

Figure 3A:
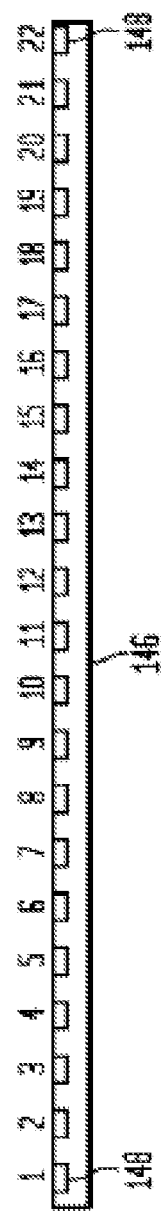
FIG. 3A is a functional schematic of an electrode array including 22 electrodes spaced apart from one another.

FIG. 3A illustrates a more detailed view, albeit functionally, of an exemplary electrode array 146 comprising a plurality of electrodes 148 labeled 1-22, in accordance with an embodiment. In an exemplary embodiment, each electrode 148 is an electrode that corresponds to a specific frequency band channel of the cochlear implant 100, where electrode 22 corresponds to the lowest frequency band (channel), and electrode 1 corresponds to the highest frequency band (channel). Briefly, it is noted that during stimulation by the electrodes to evoke a hearing percept, one or more electrodes 148 is activated at a given electrode stimulation level (e.g., current level).

In an exemplary embodiment, the electrode array assembly 190 includes at least an intra-cochlear region where the carrier of the electrodes 148 (the electrode carrier) is made of a viscoelastic material. In an exemplary embodiment, the carrier of the electrodes 148 is made of viscoelastic polyurethane foam, which in some embodiments can be a memory foam, a polyurethane with additional chemicals that increase the material's viscosity and density, a material such as what is utilized in earplugs, etc. In an exemplary embodiment, the electrode carrier is made of viscoelastic silicone (as distinguished from non-viscoelastic silicone, such as Nusil's 48-series of medical grade liquid silicone rubber).

In an exemplary embodiment, the electrode carrier is made of a material on a per unit volume basis that exhibits more viscosity than a same electrode carrier made of a conventional silicone class material and a rubber class material approved by the United States Food and Drug Administration approved for use in medical implants in general, or, in some other embodiments, for the portion of the cochlear implant that is inserted into the cochlea and permanently remains in the cochlea as of May 13, 2010, on a per unit volume basis, all other things being equal (e.g., temperature (both ambient and temperature of the material)).

By "made of," it is meant that the component at issue is at least 50.1% by weight of the material at issue (not including impurities). In an exemplary embodiment, the component at issue is at least 60%, 70%, 80%, 90%, or 100% by weight constructed of the material at issue (not including impurities).

In an exemplary embodiment, the viscosity features (or, in some other embodiments, the features equivalent or analogous to the viscosity features) of the material of which the electrode carrier is made has a viscosity feature, on a per unit volume basis, that is at least about 50%, 75%, 100%, 150%, 200%, 250%, 300%, 350%, 400%, 450%, 500%, 550%, 600%, 700%, 800%, 900%, 1000%, 1100%, 1200%, 1300%, 1400%, 1500%, 1600%, 1700%, 1800%, 1900%, or 2000% or more or any value or range of values therebetween in 1% increments (e.g., 451%, 33%, 180% to 1776%, etc.) greater that the viscosity features of non-viscoelastic silicone and/or non-viscoelastic rubber and/or one or more or all of the above-referenced silicones approved by the Food and Drug Administration, all other things being equal.

Figure 3C:
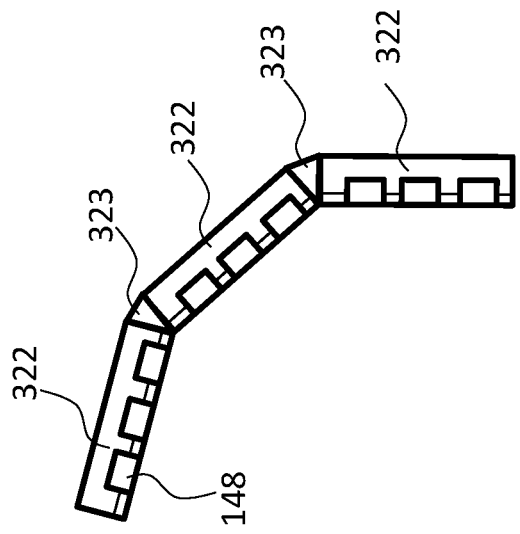
FIG. 3C is a functional schematic of the exemplary embodiment FIG. 3B shown in a curved state.

That said, in an alternate embodiment, the electrode array includes a viscoelastic material. In some embodiments, the viscoelastic material is utilized at strategic locations. For example, FIG. 3B functionally depicts a portion of an exemplary electrode array that includes a carrier made of non-viscoelastic material at sections 322 and viscoelastic material at sections 323, which viscoelastic material is in a restrained/deformed state. As can be seen in FIG. 3C, which represents the portion of FIG. 3B after the restraint is removed, the viscoelastic sections 323 expand while the non-viscoelastic sections 322 do not expand (or expand very little). Here, the electrode carrier is such that the amount of viscoelastic material by weight is less than 50%. Some embodiments include any utilization of a viscoelastic material that can enable the teachings detailed herein and/or variations thereof.

Figure 3B:
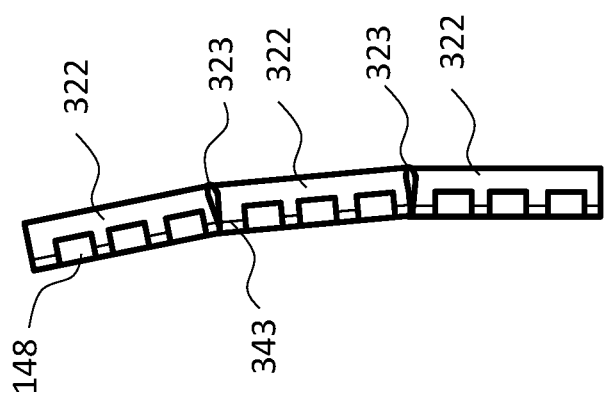
FIG. 3B is a functional schematic of an exemplary embodiment of a portion of an electrode array.

FIG. 3B also functionally depicts the electrical leads/wires (represented by reference numeral 343) that place the electrodes 148 into signal communication with the receiver stimulator. In at least some embodiments, the leads 343 are non-stretchable (at least compared to silicone) and, therefore, in at least some embodiments, will stay the same length during bending. The leads therefore can, in some embodiments, establish the neutral bend line, and thus the carrier material outside of this bend line (e.g., to the right of the leads 343 in FIG. 3B) compresses during straightening, and the carrier material inside (e.g., to the left of the leads 343 in FIG. 3B) is stretched during straightening. In some exemplary embodiments, the localized viscoelastic material components would be at least substantially on the outside (including entirely), or at least more than 50% on the outside (by weight), or at least 75% on the outside (by weight), thus transforming recovery from compression into bending of the array.

Figure 4:
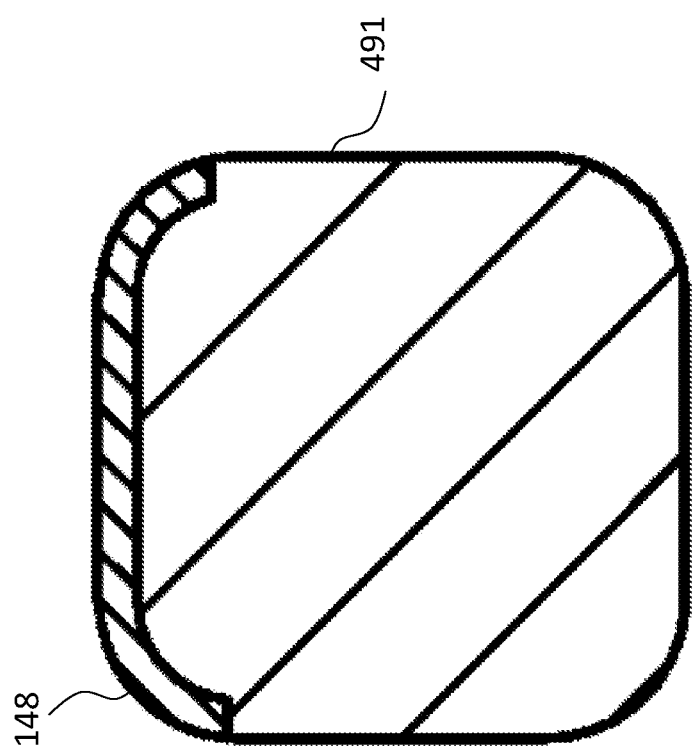
FIG. 4 is a cross-sectional view of an exemplary electrode array according to an exemplary embodiment.

Accordingly, in an exemplary embodiment, there is an electrode array, such as electrode array 190 of FIG. 1B, comprising a plurality of electrodes, such as electrodes 148, and an electrode carrier carrying the plurality of electrodes, such as the carrier 491 depicted in FIG. 4, which corresponds to a cross-sectional view of the intra-cochlear portion 190 taken through section 4-4 of FIG. 1B. In this exemplary embodiment, the electrode carrier (e.g., 491) is made of a viscoelastic material. In an exemplary embodiment, the portions of the electrode array 190 corresponding to the intra-cochlea region 188 that are not metallic and/or are not electrically conductive, such as the electrode carrier portion, is made of the viscoelastic material.

In an exemplary embodiment, the electrode carrier 491 and/or any of the portions of the electrode array detailed above and/or below specified as being viscoelastic is made of a viscoelastic silicone. In an exemplary embodiment, the electrode carrier of the electrode array 190 and/or any of the portions of the electrode array detailed above and/or below specified as being viscoelastic is devoid of non-viscoelastic silicone.

In an exemplary embodiment, the electrode array utilizes non-viscoelastic silicone and/or non-viscoelastic non-metallic components. By way of example only and not by way of limitation, in an exemplary embodiment, the proximal region of the electrode array 190 is made of non-viscoelastic silicone, and the intra-cochlea region 188 is made of viscoelastic silicone. Still further, with reference to FIG. 3B, portions of the carrier are made of non-viscoelastic silicone (e.g., portions 322), which portions are at least partially separated by portions that are made of viscoelastic silicone (or some other materials), such as portions 323).

Figure 5:
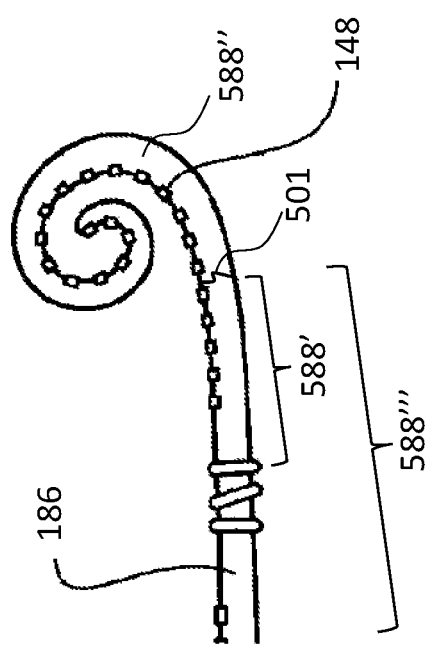
FIG. 5 is a side-view of the exemplary electrode array of FIG. 2, with additional details provided therein.

In an exemplary embodiment, at least a portion of the intra-cochlea region 188 of the electrode array and/or at least a portion of the electrode carrier of the intra-cochlea region 188 is made of viscoelastic silicone. FIG. 5 depicts an exemplary embodiment where a first portion 588' is not made of viscoelastic silicone and a second portion 588" is made of viscoelastic silicone. Note further that the demarcation between the first portion 588' and the second portion 588" can be sudden/exact, and can also be more blended, as indicated by way of example by demarcation region 501. Also, it is noted that in an exemplary embodiment, the portion of the electrode array that is not made of viscoelastic silicone can extend into the proximal region 186 (the portion that is not inserted into the cochlea) as indicated by region 588''' in FIG. 5.

As can be seen in FIGS. 1B and 2, in an exemplary embodiment, the electrode array 190 in general, and the intra-cochlea region 188 in particular, and the electrode carrier of the intra-cochlea region 188 with specificity, has a curved configuration in an unrestrained completely relaxed state. Moreover, the electrode array 190 in general, and the intra-cochlea region 188 in particular, and the electrode carrier of the intra-cochlea region 188 with specificity, is configured to recover to a curved state from a substantially straight (which includes straight) state (this being "automatic" upon the removal of force that resulted in the substantially straight state). Owing to the viscoelastic materials utilized in at least some exemplary embodiments, the electrode array 190 in general, and the intra-cochlea region 188 in particular, and the electrode carrier of the intra-cochlea region 188 with specificity, is configured to recover to a curved state in an unrestrained and relaxed state from a substantially straight state resulting from restraining forces on the electrode array (which forces are removed, starting the following temporal periods at the removal thereof) in no less than 30 seconds in some embodiments, in no less than 1 minute in some embodiments, in no less than 1.5 minutes in some embodiments, in no less than 2 minutes in some embodiments, in no less than 2.5 minutes in some embodiments, in no less than 3 minutes in some embodiments, in no less than 3.5 minutes in some embodiments, and in some embodiments, in no less than 4 minutes. In an exemplary embodiment, the aforementioned curved electrode arrays are arrays that subtend an angle of at least 45 degrees in an unrestrained and relaxed state. In an exemplary embodiment, the aforementioned curved electrode arrays are arrays that subtend an angle of at least 90 degrees in an unrestrained and relaxed state. In an exemplary embodiment, the aforementioned curved electrode arrays are arrays that subtend an angle of at least 135 degrees in an unrestrained and relaxed state. In an exemplary embodiment, the aforementioned curved electrode arrays are arrays that subtend an angle of at least 180 degrees in an unrestrained and relaxed state. In an exemplary embodiment, the aforementioned curved electrode arrays are arrays that subtend an angle of at least 45, 60, 90, 210, 250, 275, 300, 330, 360, 390, or 410 or more degrees or any value therebetween in 1 degree increments (e.g., 100 degrees, 67 degrees, 177 degrees, etc.), in an unrestrained and relaxed state.

In an exemplary embodiment, the curved electrode arrays are configured such that after the curved electrode arrays are deformed from their unrestrained and relaxed state by placing at least the intra-cochlea portion of the electrode array into a tube (or simply due to the fact that it is placed into the tube) having a constant inner diameter of no more than 3 mm, no more than 2.5 mm, no more than 2.0 mm, no more than 1.5 mm, or no more than 1 mm, which tube has a length that is longer than the intra-cochlea portion of the electrode array and is effectively undeformable by the force applied thereto by the electrode array seeking to revert back to its relaxed state (e.g., the tube can be a stainless steel tube made of surgical stainless steel having a wall thickness of 5 mm), and remaining therein for a period between about 1.5 minutes and about 7 minutes, or at least 2, 3, 4 or 5 minutes, the aforementioned temporal and curved features are achieved after complete removal from the tube.

Thus, in an exemplary embodiment, there is an electrode array configured such that, after placing the intra-cochlea region thereof into a tube corresponding to one or more of the aforementioned tubes, and maintaining the intra-cochlea region therein for at least five minutes, at 80 degrees Fahrenheit and at one atmospheric pressure, and at a humidity level of 50%, subsequent to complete removal of the intra-cochlea region from the tube, the intra-cochlea region takes at least 30 seconds, at least 45 seconds, at least 60 seconds, at least 75 seconds, at least 1.5 minutes, at least 2 minutes, at least 2.5 minutes, at least 3 minutes, at least 3.5 minutes, at least 4 minutes, at least 4.5 minutes, or at least 5 minutes or more to subtend an angle of at least 45, 60, 90, 210, 250, 275, 300, 330, 360, 390, or 410 or more degrees or any value therebetween in 1 degree increments (e.g., 100 degrees, 67 degrees, 177 degrees, etc.), in an unrestrained and relaxed state.

In an exemplary embodiment, the aforementioned electrode array has dimensions such that, in the relaxed and unrestrained state, a maximum outer diameter of the electrode carrier at a location immediately adjacent the most proximal electrode is between about 1.1 mm and 0.15 mm, or is no more than about 1.0 mm, 0.9 mm, 0.8 mm, 0.7 mm, 0.6 mm, 0.5 mm, 0.4 mm, 0.3 mm, 0.2mm or any value or range of values therebetween in 0.01 mm increments, and a maximum outer diameter of the electrode carrier at a location immediately adjacent the most distal electrode is no more than about 0.7 mm, 0.6 mm, 0.5 mm, 0.4, 0.3 mm, 0.2 mm or 0.1 mm, or any value or range of values therebetween in 0.01 mm increments.

Figure 6:
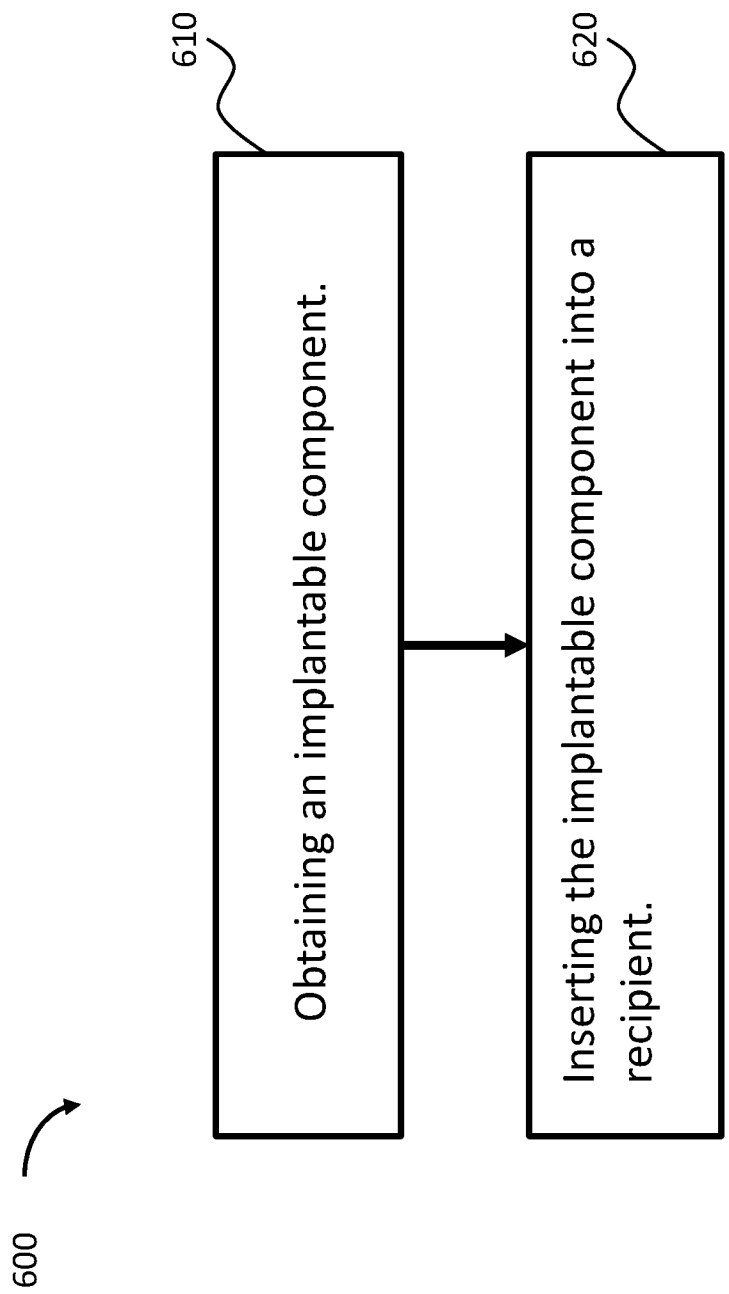
FIG. 6 presents an exemplary flowchart for an exemplary method according to an exemplary embodiment.
Figure 10A:
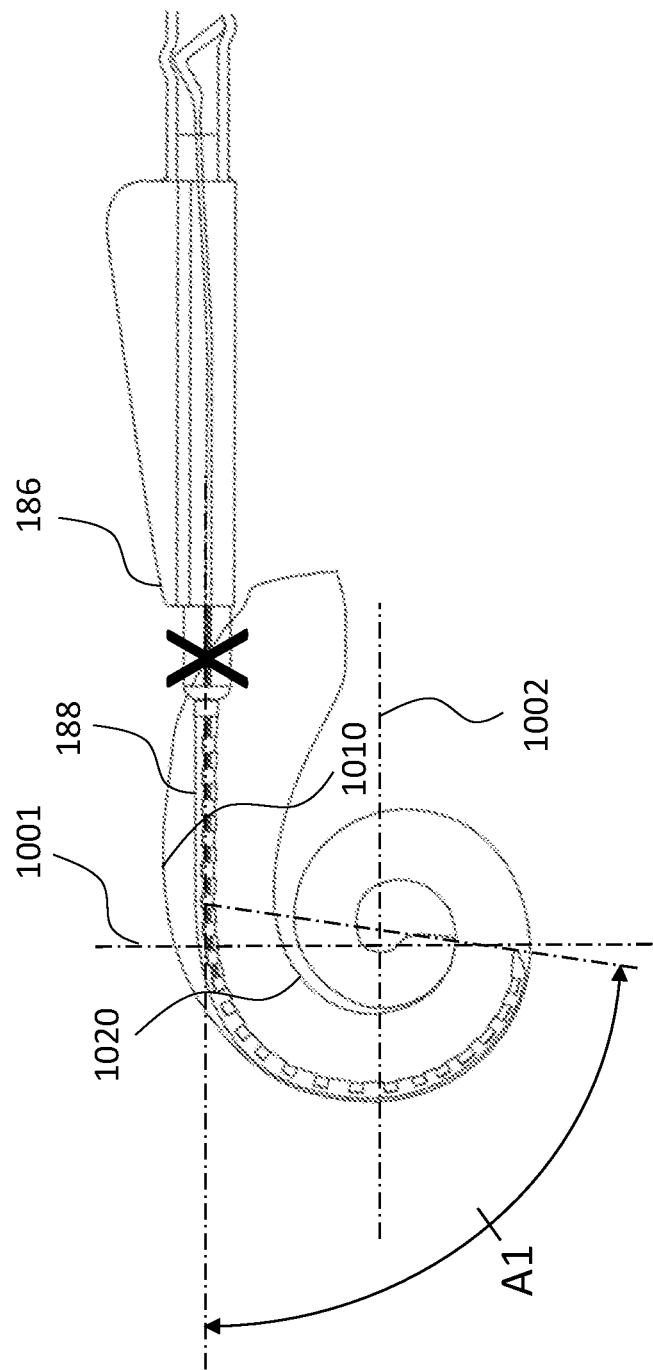
FIGS. 10A and 10B depict a side view of an electrode array in a first geometry after insertion thereof into a cochlea.
Figure 10B:
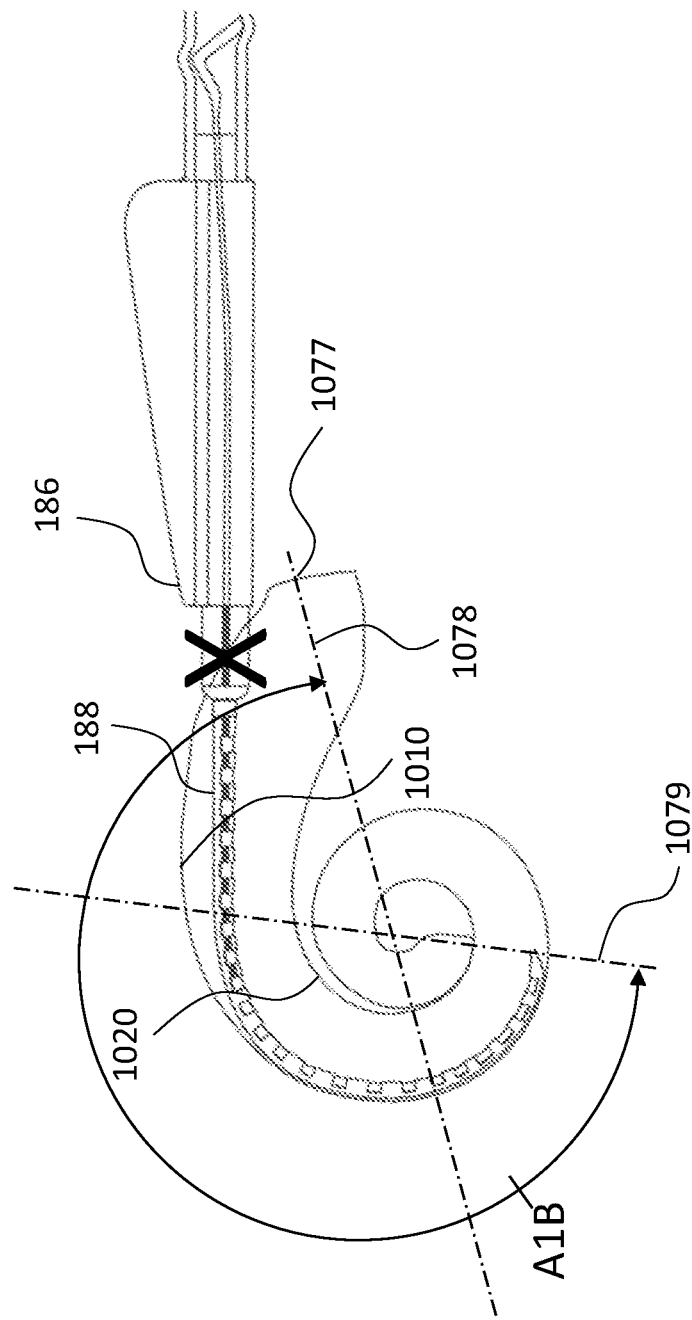

FIG. 6 presents an exemplary flowchart 600 for an exemplary method according to an exemplary embodiment. Method 600 includes method action 610, which entails obtaining an implantable component, such as by way of example only and not by way of limitation, implant 144 in its entirety, or at least the elongate array 118 thereof, or at least the electrode array 190 (with reference to FIG. 1B). Method 600 further includes method action 610, which entails, inserting the implantable component into a recipient (which can be achieved by implanting the electrode array 190 into the cochlea (i.e., implanting the intra-cochlea region 188). Method 600 is executed using an implant 144 configured such that subsequent to the full insertion of the implantable component (with respect to the implant 144, subsequent to final placement of the intra-cochlea region into the cochlea, as seen in FIGS. 10A and 10B below), the implantable component transforms from a first geometry to the second geometry (as seen in, for example, FIGS. 11A and 11B below) without external force relief, external pressure relief, reaction force, mass transfer and net energy transfer inducing and/or establishing the transformation. In an exemplary embodiment, this is achieved due to the viscoelastic properties of the electrode carrier. In an exemplary embodiment, the action of transforming from the first geometry to the second geometry is entirely a result of an elastic material devoid of metal.

Figure 7:
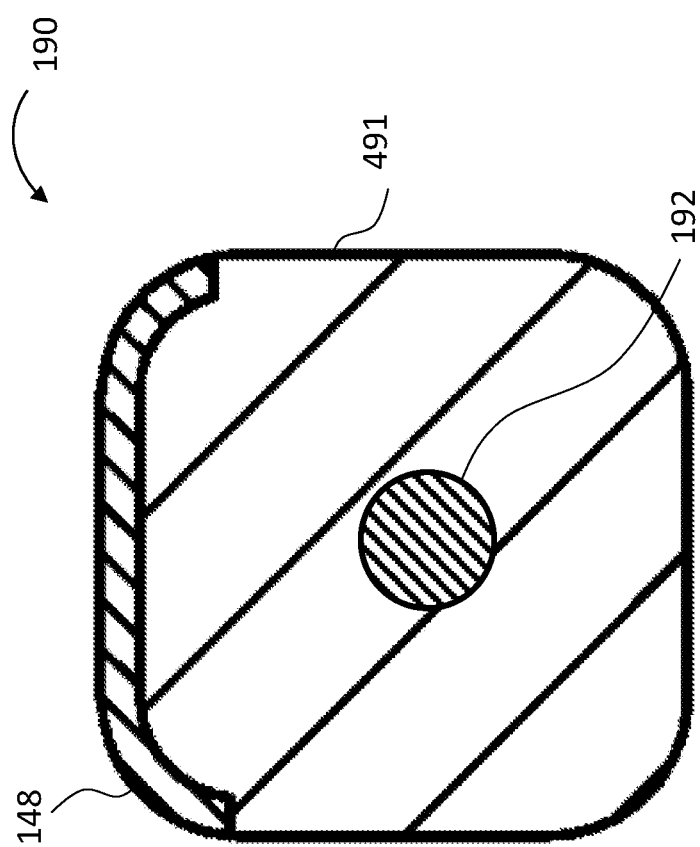
FIG. 7 is a cross-sectional view of another exemplary electrode array according to an exemplary embodiment.

By without external force relief, it is meant that the transformation does not start with and/or is not established from the removal or relaxation of a force applied to the electrode carrier, such as, for example, that which results when a so-called stylet is removed from the intra-cochlear portion of the electrode array. In this regard, FIG. 7 depicts an exemplary embodiment of an electrode array that includes a stylet 192 (FIG. 7 corresponds to FIG. 4 except for the addition of the stylet 192). Method 600 can be practiced with or without electrode arrays that utilize a stylet as long as the aforementioned feature of the transformation results in addition to any transformation that results from the removal of the stylet (removal in part or removal in full).

By without external pressure relief, it is meant that the transformation does not start with and/or is not established from the removal or relaxation of a pressure applied to the electrode carrier, such as, for example, that which results when the electrode array is removed from a so-called insertion sheath. By without mass transfer, it is meant that the transformation does not start with and/or is not established from a component of the electrode array being transferred therefrom, such as, for example, that which results from a portion of the electrode array dissolving.

By without reaction force, it is meant that the transformation does not start with and/or is not established from a force that is reactive against a surface (e.g., a surface of the recipient, a surface of the electrode array, etc.), such as, for example, that which results when a portion of the electrode array springs out or otherwise extends to a location in contact with a portion of the cochlea so as to "push" the electrode array from a position that existed prior to the reaction force.

By without net energy transfer, it is meant that the transformation does not start wtih and, in some instances, does not result from, a net change in energy transfer to or from the electrode array, such as, for example, that which results when a portion of the electrode array heats or cools from a temperature thereof at the time that the electrode array was fully inserted into the cochlea.

In an exemplary embodiment, the action of transforming from the first geometry to the second geometry is executed without moving any component relative to the implant that initiates and/or establishes transformation. In an exemplary embodiment, no stylet is moved or otherwise withdrawn such that the transformation is initiated. In an exemplary embodiment, no insertion sheath (or any sheath for that matter) is moved or otherwise withdrawn such that the transformation is initiated.

It is noted that the first geometry is not necessarily the constrained geometry. In an exemplary embodiment, again with reference to FIG. 7, a stylet is located in at least a portion of the electrode array during at least a portion of the insertion process of the electrode array into the cochlea. In this regard, in an exemplary embodiment, the electrode array is inserted in a third geometry different from the first and second geometry. In an exemplary embodiment, after the stylet is removed, as a result of the stylet, which generally forces the array to be more straight/less curved than that which would otherwise be the case, all things being equal, the electrode array transitions from the third geometry (the geometry associated with the presence of the stylet in the electrode array) to the first geometry, and it is the viscoelastic properties of the electrode array that initiate the transition and/or establish the transformation from the first geometry to the second geometry. Such can also be the case in scenarios utilizing insertion sheaths, etc. The point is that the first geometry need not necessarily be the insertion geometry. In fact, in scenarios where the electrode array is inserted such that the outer side of the curved array (the side facing away from the "center" about which the curved array extends/the side facing away from the electrodes in the case where the electrodes do not completely extend about the outer circumference of the electrode array) and/or the tip of the array contacts the lateral wall of the cochlea, the force of insertion will quite frequently drive the electrode array into a geometry away from the insertion geometry (the driven geometry being the aforementioned first geometry in at least some exemplary embodiments). Conversely, in embodiments where the insertion process is such that the curved array extends into the cochlea during the insertion process such that the curved array does not come into contact with any of the walls in the cochlea, the insertion geometry can be the aforementioned first geometry.

In an exemplary embodiment, the electrode array is configured such that the recovery time to recover from the third geometry to the first and/or second geometry is sufficient for the surgeon to insert the electrode array into the cochlea in a geometry corresponding to and/or substantially corresponding to the third geometry and/or in a geometry "between" the third geometry and the first geometry. In an exemplary embodiment, this provides sufficient time for the tip of the electrode array to reach the back of the basil turn of the cochlea, and thus avoid tip fold-over.

In view of the above, in an exemplary embodiment, it is to be understood that with respect to the method 600, the implantable component is a cochlear electrode array (e.g., array 190), and the action of inserting the implantable component into the recipient (method action 620) entails inserting the implantable component into a cochlea (e.g., a cochlea of a human recipient). The first geometry is a curved geometry resulting at least in part from the curvature of the cochlea (e.g., the electrode array contacts the lateral wall of the cochlea, thus deforming the electrode array from the geometry that was the case prior to the electrode array contacting the lateral wall of the cochlea). In an exemplary embodiment, the second geometry is a curved geometry having an average radius of curvature (e.g., the average radius of curvature over the first distance noted above, or the average radius of curvature over the distance extending from the inside wall of the cochlea at the point where the electrode array enters the cochlea to the tip of the cochlea, etc.) that is lower than that of the first geometry.

In view of the above, in an exemplary embodiment of method 600, where the implantable component is a cochlear electrode array, the action of inserting the implantable component into the recipient (the action of inserting the electrode array into the cochlea) entails inserting the implantable component into a cochlea of a recipient in a third geometry, where the first geometry is a curved geometry resulting at least in part from the curvature of the cochlea (e.g., due to resistance from the lateral wall from the insertion geometry), and the third geometry is one of a substantially straight geometry or a negatively curved geometry relative to the curved geometry of the first geometry (it is noted that this third geometry is not necessarily the insertion geometry —more on this below). In this regard, in an exemplary embodiment, method 600 entails obtaining an electrode array, which, in at least some exemplary embodiments, has a relaxed curved state such that, with respect to the frame of reference of FIGS. 1B and 2, the electrode array curves in a counter-clockwise direction. Put another way, the electrode array curves such that the electrodes "see" more of each other. Method 600 further entails deforming the electrode array from this relaxed curved state to a straight/ substantially straight configuration (or the method entails obtaining the electrode array in this straight/substantially straight geometry). In an alternate embodiment, method 600 further entails deforming the electrode array from this relaxed curved state to a negatively curved state (or obtaining the electrode array in this negatively curved state), where the electrode array curves in a clockwise direction with respect to the frame of reference of FIGS. 1B and 2. Put another way, the electrodes see "less" of each other, just as the curvature of the Earth causes one to see less of structures because the curvature of the Earth eclipses some or all of the structures. In an exemplary embodiment, there can be utilitarian value with respect to deforming the electrode array to this negative curvature because, in at least some exemplary embodiments, the time between the release of the forces applied to the electrode array to place the electrode array and/or to hold the electrode array in this negatively curved geometry and the time at which the electrode array returns to its relaxed state is longer (e.g., due to, for example, the increased degree of strain of the viscoelastic material associated with deforming it further from its relaxed configuration) than that which would be the case with respect to the time between the release of forces applied to the electrode array to place the electrode array and/or to hold the electrode array in a substantially straight geometry and the time in which the electrode array returns to its relaxed state. In an exemplary embodiment, the former is at least about 1.1, 1.2, 1.3, 1.4, 1.5, 1.6, 1.7, 1.8, 1.9, or 2 times or more than the latter.

In an exemplary embodiment, the negative curvature is a curvature that results from the electrode array subtending an angle that is opposite of that of its relaxed state (but not necessarily the same value). In an exemplary embodiment, the negative curvature can result in the electrode array subtending an angle that is more than 10, 20, 30, 40, 50, 60, 70, 80, 90, 100, 110, 120, 130, 140, or 150 degrees or more. In an exemplary embodiment, the negative curvature can result in the electrode array subtending an angle that corresponds to that which would meet and/or exceed the aforementioned temporal periods noted above relative to that which is the case where the electrode array is held in a substantially straight geometry. Corollary to this is that in an exemplary embodiment, there is a device that is utilized to force the electrode array or otherwise to maintain the electrode array in the geometry such that it has the aforementioned negative curvature. In an exemplary embodiment, this device can be a metallic and/or a plastic block or structure having a path therein corresponding to the negative curvature that is desired. In an exemplary embodiment, this device can be provided with the electrode array. In an exemplary embodiment, the electrode array can be shipped to the location of surgery or the like with the electrode array in this device. That is, in an exemplary embodiment, when the surgeon opens packaging containing the electrode array (typically sterilely sealed packaging), the electrode array is already in this negatively curved geometry.

While the embodiments detailed above have often focused on the first geometry being different than the insertion geometry, it is noted that the first geometry associated with method 600 can be the insertion geometry. The fact that the insertion process deforms the electrode array into another geometry different from the insertion geometry does not necessarily prevent the insertion geometry from being the first geometry. Accordingly, any geometry specified herein as being the first geometry and any geometry specified herein as being the second geometry can be a particular geometry at issue.

In an exemplary embodiment where the implantable component is a cochlear electrode array, the action of inserting the implantable component into the recipient entails inserting the electrode array into a cochlea of a recipient in the first geometry (e.g., a straight or straightened geometry (relative to its natural/unrestrained/relaxed geometry), such as can be achieved via the utilization of a stylet and/or in insertion sheath etc.).

In an exemplary embodiment where the implantable component is a curved cochlear electrode array, the action of inserting the implantable component into the recipient entails inserting the implantable component into a cochlea of a recipient in a third geometry, and the aforementioned second geometry is a curved geometry. The third geometry is one of a substantially straight geometry or a negatively curved geometry relative to the curved geometry of the second geometry, and the second geometry is closer to a relaxed state of the electrode array than the third geometry. That is, in an exemplary embodiment, the second geometry is not necessarily the relaxed state. This is for at least three reasons, as will briefly now be detailed.

In general, in some exemplary embodiments, the aforementioned performance features are features associated with an inserted electrode array in a cochlea. In this regard, the aforementioned performance features can be features that are achieved via laboratory tests or the like, where the electrode array is never inserted in a cochlea. In this regard, the electrode arrays placed into various geometries and/or maintaining the various geometries as detailed herein (e.g., utilizing the tube noted above, etc.), and then permitted to completely relax/return to its relaxed state in a controlled environment (e.g., an environment of 1 atmosphere at 80 degrees F. at 50% relative humidity, etc.). Accordingly, in an exemplary embodiment, the second geometry is the relaxed geometry. However, with respect to the at least three exemplary reasons why the second geometry is not necessarily the relaxed geometry, in an exemplary embodiment (a first reason), the second geometry can be considered, for the purposes of evaluating a product at least, a geometry that corresponds to a fraction of the relaxed geometry. By way of example only and not by way limitation, the second geometry can be a geometry corresponding to the geometry where the electrode array has returned to 70%, 75%, 80%, 85%, 90%, or 90% of its relaxed geometry. For example, in an exemplary embodiment where the electrode array subtends an angle, in its relaxed state of 360 degrees, the second geometry might be 324 degrees (90% of its relaxed geometry) or 288 (80% of its relaxed geometry, etc.).

With respect to a second reason, such as with respect to a scenario where the electrode array is actually inserted in the cochlea, the modiolus wall of the cochlea can prevent the electrode array from achieving is fully relaxed state. In this regard, depending on the specific geometry of a given cochlea, the cochlea can have an average radius of curvature at the modiolus wall (or the portion of the cochlea about which the electrode array extends/the portion of the cochlea facing the electrodes where the electrodes do not completely extend about the outer circumference of the electrode array, etc.) that is greater than the average radius of curvature of the electrode array in its relaxed state at the portions of the electrode array that would face the portion of the cochlea associated with the average radius of curvature of the cochlea at issue.

With respect to a third reason, embodiments can exist where the electrode array is prevented from achieving a geometry corresponding to its relaxed state even in a scenario where the cochlea permits such to results.

Thus, in some instances, the aforementioned second geometry is a relaxed state of the electrode array. In some instances, the aforementioned second geometry is a fraction of the relaxed state of the electrode array. In some instances, the aforementioned second geometry is a final geometry of the electrode array when located in the cochlea governed by the geometry of the cochlea (and the insertion geometry). Still further, in some instances, the aforementioned second geometry is a final geometry of the electrode array when located in the cochlea governed by the overall structure of the implant (which may or may not be influenced by the cochlea).

In an exemplary embodiment, the transformation from any of the first geometries (whether it be the insertion geometry or the geometry resulting from contact with respect to the lateral wall the cochlea, or the pre-insertion geometry, etc.) detailed herein to any of the second geometries detailed herein takes at least about 30 seconds. In an exemplary embodiment, the transformation from the first geometry to a second geometry takes at least about one minute. In an exemplary embodiment, the transformation from the first geometry (the insertion geometry) to the second geometry takes at least about 30 seconds, at least about 45 seconds, at least about 90 seconds, at least about 105 seconds, at least about 120 seconds, at least about 135 seconds, at least about 150 seconds, at least about 165 seconds, at least about 180 seconds, at least about 3.5 minutes, at least about 4 minutes, at least about 4.5 minutes, or at least about 5 minutes or more or any value therebetween in one second increments.

It is further noted that in an exemplary embodiment, any of the first geometries can be any of the negatively curved geometries disclosed herein.

Figure 8:
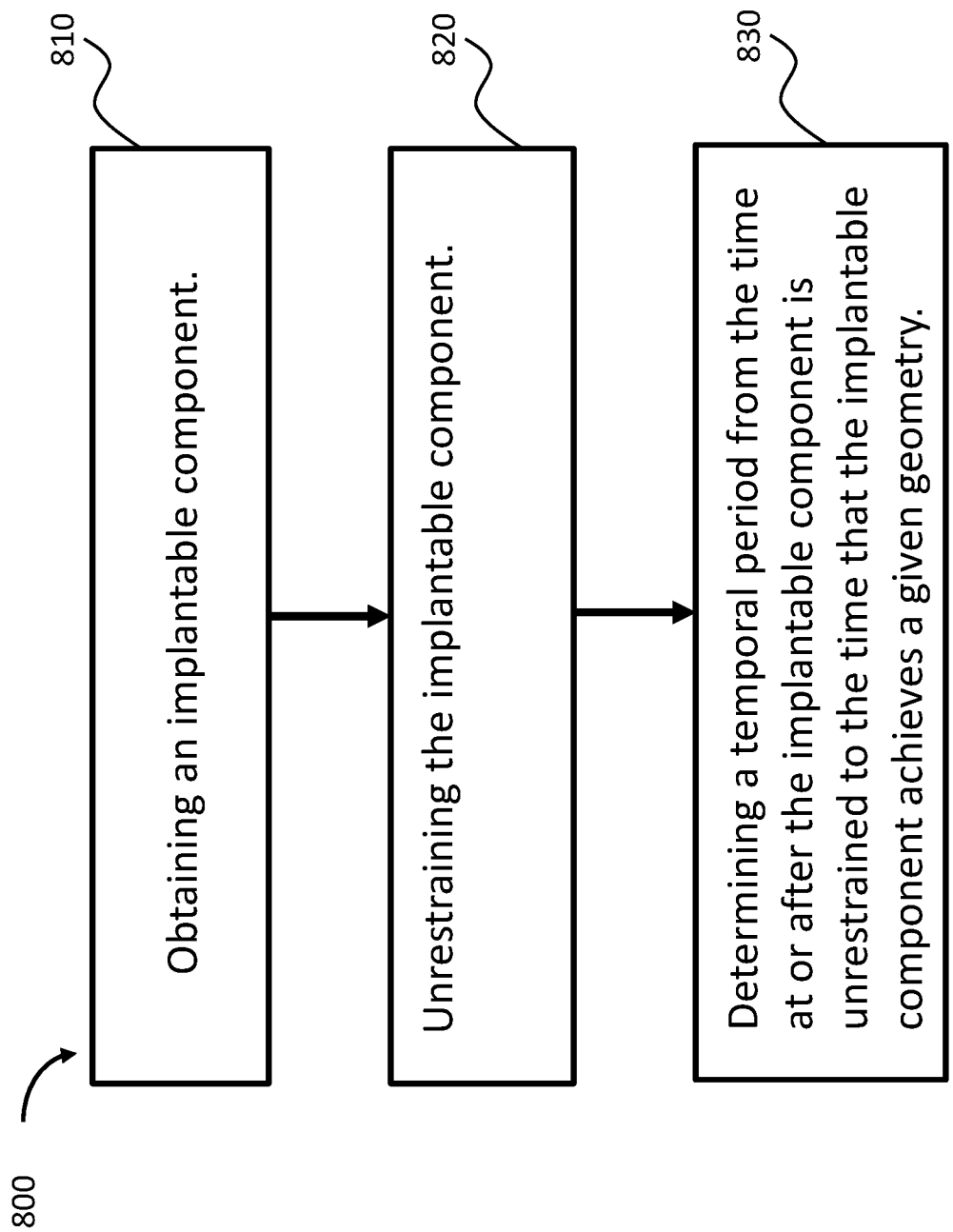
FIG. 8 presents an exemplary flowchart for another exemplary method according to an exemplary embodiment.

It is also noted that while method 600 is directed towards inserting the implantable component (the cochlear electrode array) into the cochlea, in an alternative embodiment, method 600 can be modified to instead be a test method to determine whether a given implantable component meets the given criteria. In this regard, in an exemplary embodiment, any disclosure herein of inserting the implantable component into a recipient can be replaced with the action of unrestraining the implantable component. More specifically, FIG. 8 details an exemplary method of determining whether or not an implantable component corresponds to the teachings detailed herein. FIG. 8 details method 800, which includes method action 810, which entails obtaining an implantable component. Method 800 further includes method action 810, which entails on restraining the implantable component. In this regard, it is noted that in some embodiments of method 800, the obtained implantable component is an implantable component that is already in the restrained condition such that it is deformed from its relaxed state. Still further in this regard, it is noted that in some other embodiments of method 800, the obtained implantable component is an implantable component that is in its relaxed state, and at some point between method action 810 and method action 820, the implantable component is deformed from its relaxed state.

In an exemplary embodiment, the deformation from its relaxed state can be any of the deformations detailed herein, such as those detailed herein with respect to the scenarios where the implantable component is a cochlear electrode array. In an exemplary embodiment, the deformation from its relaxed state is deformation corresponding to any of the first and/or third geometries detailed herein.

Method 800 further includes method action 830, which entails determining a temporal period from the time at or after the implantable component is unrestrained to the time that the implantable component achieves a given geometry, which given geometry can be, in at least some exemplary embodiments, any of the second geometries detailed herein. If the determined temporal period corresponds to the temporal period specified (e.g., any of the temporal periods detailed herein), the implantable component is deemed to correspond to the given configuration (e.g., the configuration detailed herein). It is noted that method 800 need not necessarily be executed in a manner such that the implantable component is placed into the recipient. In this regard, method 800 can be executed in a laboratory or the like. With respect to embodiments where method 800 is executed during a surgery implanting the implantable component, the temporal period involved can be determined via the use of X-rays or markers located on the implantable component (e.g., such as at the tip and the location at the beginning of the intra-cochlea region of the electrode array, etc.).

Figure 9:
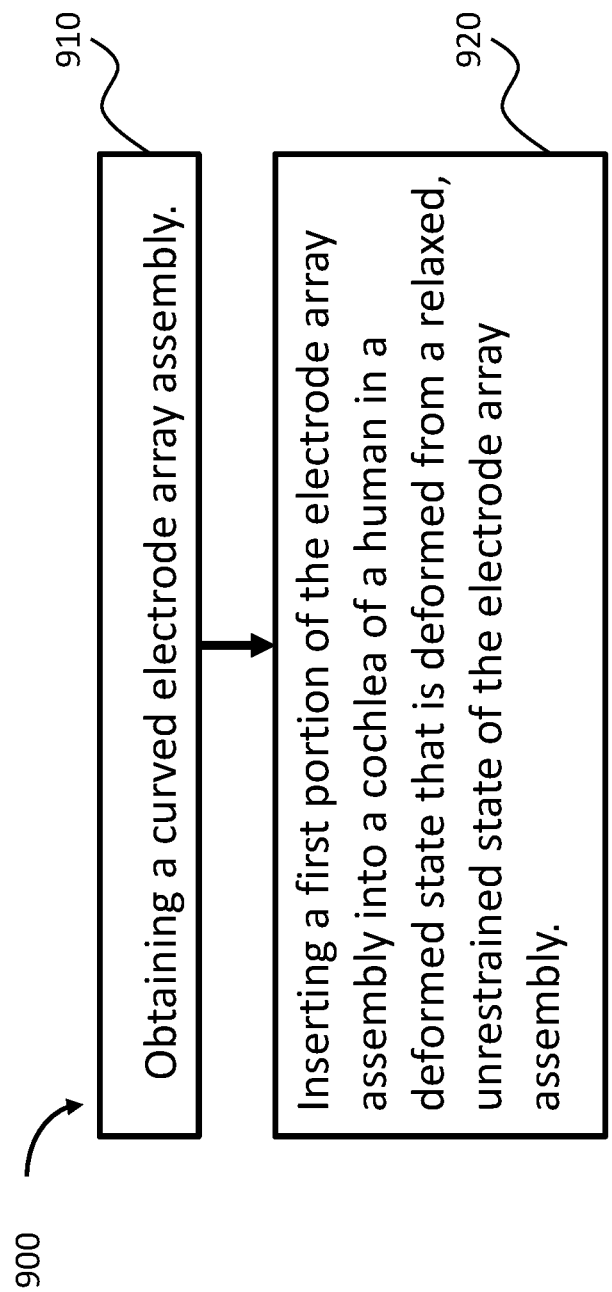
FIG. 9 presents another exemplary flowchart for an exemplary method according to an exemplary embodiment.

FIG. 9 presents a flowchart for another exemplary method. In FIG. 9, method 900 includes method action 910, which entails obtaining a curved electrode array assembly. The curved electrode array assembly is an electrode array that, in a relaxed, unrestrained state, is curved. This is the case irrespective of whether the obtained electrode array is in a straight geometry or otherwise in a non-curved geometry (e.g., because it is restrained from its relaxed state). Method 900 further includes method action 920, which entails inserting a first portion of the electrode array assembly into a cochlea of a human in a deformed state that is deformed from a relaxed, unrestrained state of the electrode array assembly. In an exemplary embodiment, the deformed state is a state in which the electrode array, or at least the intra-cochlear portion 188, is substantially straight. As noted above, in an exemplary embodiment, the deformed state is a state in which the electrode array has a negative curvature relative to that of its relaxed state. That said, in an alternate embodiment, the deformed state is a state in which the electrode array is curved. The curvature is less than the curvature of its relaxed state.

In the embodiment detailed herein, method action 920 is executed such that the first portion corresponds to a portion of the electrode array assembly extending a first distance of the electrode array assembly starting from a tip of the electrode array to a location proximal of the tip that is located in the cochlea. In an exemplary embodiment, the first distance is the distance of the intra-cochlea portion of the electrode array 190. Method action 920 is executed such that the portion of the electrode array making up the first distance is inserted at a first angular depth into the cochlea. FIGS. 10A and 10B depict such an exemplary angular depth, where the first distance is measured from the tip of the electrode array to the X through the longitudinal axis of the intra-cochlea electrode portion 188 of the electrode array. More specifically, FIGS. 10A and 10B depict a cross-sectional compressed view of a human cochlea with a lateral wall 1010 and a modiolus wall 1020 with an electrode array therein at a first geometry. In FIG. 10A, the orientation of the electrode array, relative to the location where the electrode array begins to curve, is 90 degrees plus A1, which, based on the scale of FIG. 10A, is about 170 degrees. With respect to the axis 1001 and 1002, which is static in that it is based on the geometry of the cochlea (centered on the modiolus, with the axis 1002 parallel to the direction of insertion of the electrode array at the point the electrode array enters the cochlea in the first geometry), the electrode array subtends an angle of 180 degrees. That is, the angular depth is such that the electrode array in general, and the intra-cochlear portion in particular, subtends an angle of about 180 degrees.

With respect to FIG. 10B (and FIG. 11B), this figure depicts a frame of reference depicting the first insertion depth as measured from the axis 1078 that passes through the round window 1077 (e.g., depicting a traditional frame of reference for angular insertion depth, using the round window to establish one of the axes, as differentiated from the arrangement of FIG. 10A), where axis 1078 and axis 1079 extend through the traditional center used to calculate insertion depth. The initial insertion depth is about 250 degrees. With respect to the axis 1078 and 1079, which is static in that it is based on the geometry of the cochlea (centered on the modiolus, with the axis 1078 passing through the round window 1077) the electrode array subtends an angle of A1B. That is, the angular insertion depth is such that the electrode array in general, and the intra-cochlear portion in particular, subtends an angle of about 250 degrees when fully inserted into the cochlea.

With respect to fully inserted in the cochlea, it is noted that this is in the insertion which corresponds to insertion through the round window or through a cochleostomy, whichever be the case. In this regard, a given electrode array is configured for a specific insertion depth. That is, a given electrode array has a given length, and a percentage of that length is to be inserted into the cochlea during a normal implantation process in some embodiments, such as the embodiment in FIG. 2, the electrode array includes rings 197 that aid in sealing the hole into the cochlea. In some embodiments, the electrode array includes a "stop" surface that prevents further insertion of the electrode array into the cochlea, where, during a surgical process, the surgeon installs the electrode array as far into the cochlea as possible until the stop contacts the outer surface of the cochlea or other structure.

In an exemplary embodiment, method 900 further includes the action of securing the electrode array assembly (either directly or via securement of another portion of the implant, such as the elongate assembly 118) such that the entire portion of the electrode array assembly located in the cochlea corresponds to the first portion. While, in at least some exemplary embodiments, the action of securing the electrode array may or may not be performed before the electrode array transitions from the first geometry to the second geometry, the linear insertion of the electrode array corresponding to that which is present after the action of securing the electrode array is the same as that which exists just prior to securing the electrode array, which in turn, in some embodiments, is that which corresponds to the first portion.

In some embodiments, the electrode array and/or another portion of the stimulating assembly 118 is secured to structure of the recipient so that the electrode array does not move further in or move out of the cochlea after the electrode array is inserted to the desired depth. With respect to method 900, the first distance of the method action 920 is the fully inserted depth for the electrode array being used (where the actual depth may vary depending on the type of electrode array and/or the anatomy of the recipient). That is, the first distance can be subjective—it can be the distance that the surgeon desires that the electrode array be inserted. In an exemplary embodiment, the distance from the X to the tip (the first distance), as measured along the longitudinal axis of the electrode array, is about 15 mm, or about 16 mm, or about 17 mm, or about 18 mm, or about 19 mm or about 20 mm or about 21 mm. In some embodiments, the first distance is between about 12 mm to about 24 mm or any value or range of values therebetween in about 0.1 mm increments.

Figure 11A:
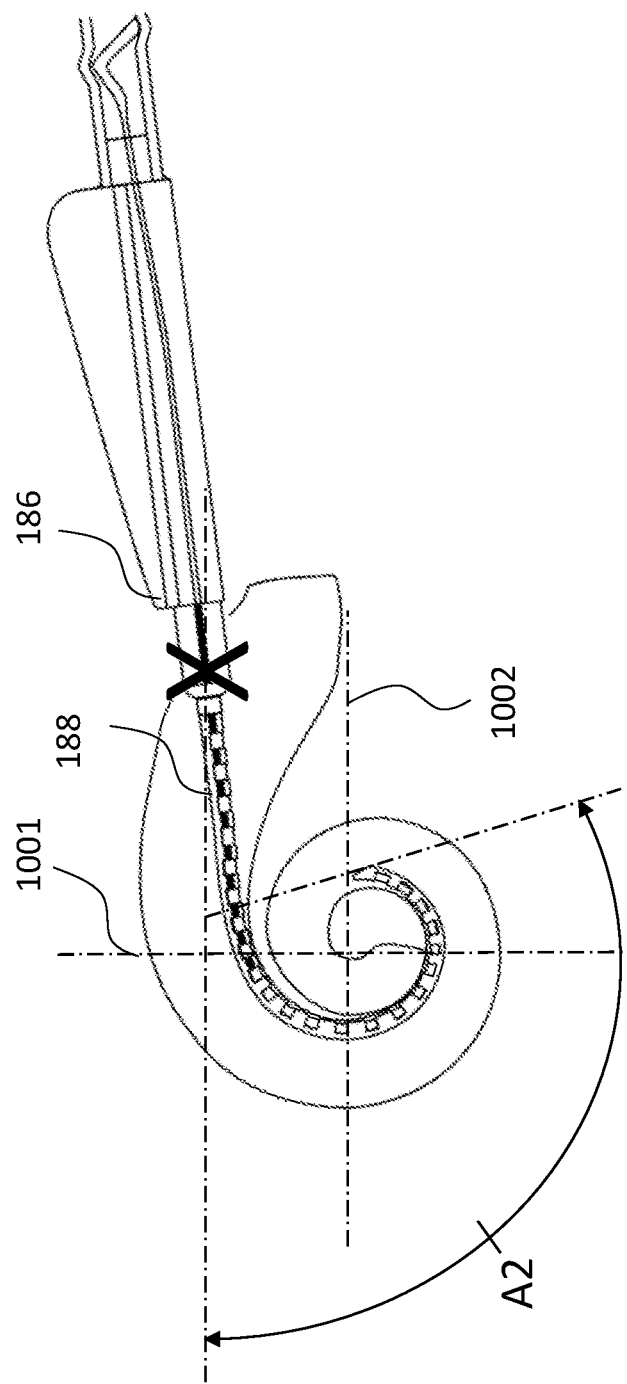
FIGS. 11A and 11B depict a side view of an electrode array in a second geometry after insertion thereof into a cochlea.
Figure 11B:
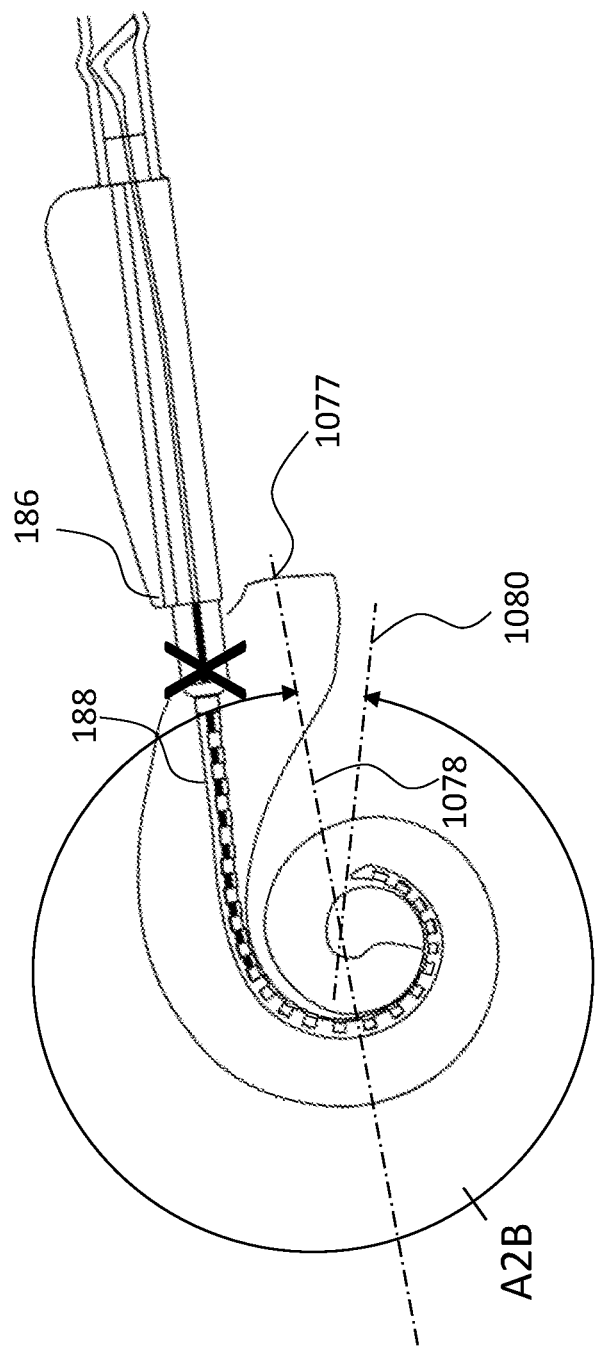

In any event, method 900 is executed such that with respect to the insertion depth/the first distance, the first portion of the electrode array assembly achieves a second angular insertion depth greater than the first angular insertion depth after the first portion making up the first distance is located in the cochlea. This is seen in FIG. 11A, where the intra-cochlear portion of the electrode array is angled relative to the original orientation 90 degrees plus A2 (which totals about 200 degrees in the scale of FIG. 11A). With respect to the axis 1001 and 1002, the electrode array subtends an angle of about 270 degrees, whereas it previously subtended an angle of 180 degrees (the geometry of FIG. 10A). The distance between the tip and X is the same as in FIG. 10, but the angular insertion depth has increased. With respect to FIG. 11B, which depicts a frame of reference depicting the second insertion depth as measured from the axis 1078 that passes through the round window 1077 (the traditional frame of reference, that of FIG. 10B), where axis 1080 extends through the traditional center used to calculate insertion depth, the second insertion depth being A2B, which is about 350 degrees to about 355 degrees. Thus, the insertion depth has increased between FIGS. 10A and 11A by about 90-95 degrees.

In an exemplary embodiment, the result of method 900 is that the difference between A1 and A2 increases by about 30 degrees. Based on the frame of reference used for A2 and A2, in an exemplary embodiment, the result of method 900 is that the difference between the first angular insertion depth and the second angular insertion depth, for the same insertion distance, using the frame of reference of A2 and A2, increases by at least 10 degrees, 15, degrees, 20 degrees, 25, degrees, 30 degrees, 35 degrees, 40 degrees 45 degrees 50 degrees, 55 degrees, 60 degrees, 65 degrees, 70 degrees, 75 degrees, 80 degrees, 85 degrees, 90 degrees, 95 degrees, 100 degrees, 105 degrees, 110 degrees, 115 degrees, 120 degrees or more or any value or range of values therebetween in 1 degree increments.

In an exemplary embodiment, the result of method 900 is that the difference between A1B and A2B is about 90 degrees. In exemplary embodiment, the result of method 900 is that the difference between the first angular insertion depth and the second angular insertion depth, for the same insertion distance (linear insertion distance), using the frame of references of A1B and A2B, increases by 75 degrees. In an exemplary embodiment, the result of method 900 is that the difference between the first angular insertion depth and the second angular insertion depth, for the same insertion distance, again using the frame of reference of A2B and A2B increases by at least 10 degrees, 15, degrees, 20 degrees, 25, degrees, 30 degrees, 35 degrees, 40 degrees 45 degrees 50 degrees, 55 degrees, 60 degrees, 65 degrees, 70 degrees, 75 degrees, 80 degrees, 85 degrees, 90 degrees, 95 degrees, 100 degrees, 105 degrees, 110 degrees, 115 degrees, 120 degrees or more or any value or range of values therebetween in 1 degree increments.

Figure 12:
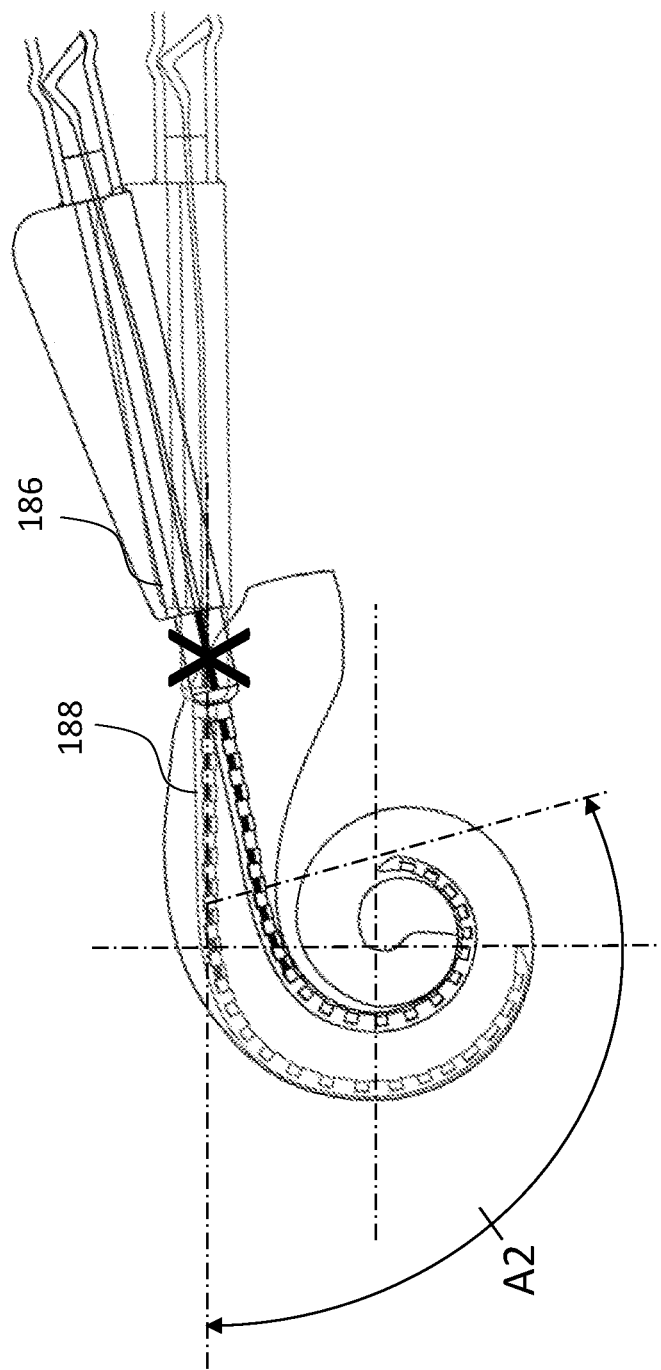
FIG. 12 depicts a side view of an electrode array in a first geometry and an electrode array in a second geometry, for comparison purposes, after insertion thereof into a cochlea.

FIG. 12 depicts the electrode array 190 simultaneously at the two different angular insertion depths of FIGS. 10A and 11A for comparison purposes.

Angular insertion depth measured using the traditional frame of reference (the frame of reference of FIGS. 10B and 11B) is referred to herein as being based on a round window frame of reference.

As can be seen, in an exemplary embodiment, a perimodiolar position of the electrode array can be achieved without external force relief, external pressure relief, reaction force, mass transfer and net energy transfer inducing a transformation of the electrode array achieving the perimodiolar position from a pre-perimodiolar position.

With reference to FIGS. 10A and 10B, it is noted that the geometry shown in FIGS. 10A and 10B correspond to the first geometry of method 600 noted above. The geometry shown in FIGS. 11A and 11B correspond to the second geometry of method 600 noted above. The third geometry noted above can be the electrode array in the substantially straightened configuration, where the lateral wall of the cochlea deforms the electrode array from the third geometry to the first geometry as the electrode array is inserted into the cochlea.

In view of the above, in an exemplary embodiment, method 900 is executed (or any other method detailed herein, for that matter), where the action of inserting the first portion of the electrode array assembly (the portion from the tip to the X in FIGS. 10A-12) into the cochlea entails inserting the first portion such that the first portion does not contact a modiolus portion of the cochlea until after the electrode array assembly is inserted the first distance. That said, in an alternate embodiment, the electrode array is of a configuration such that an exemplary method entails inserting the electrode array assembly the first distance into the cochlea without the electrode array contacting the lateral wall of the cochlea (other than, potentially, the portion of the lateral wall proximate the insertion location) and without the electrode array contacting the modiolus wall, at least not until after the first portion is fully inserted into the electrode array. In this regard, in an exemplary embodiment, method 900 is executed by "timing" the deformation that takes place of the electrode array with respect to the deformation from the first and/or third geometry to the second geometry. By way of example only and not by way limitation, in an exemplary method, when the restrained electrode array, which is restrained by way of example in a substantially straight configuration and/or a negatively curved configuration, is unrestrained, the electrode array begins to deform to (or, more accurately, towards, as the geometry of the cochlea may prevent it from ultimately reaching its unrestrained state) its unrestrained state (e.g., curved). As the electrode array deforms to/towards its unrestrained state, the electrode array is gradually inserted into the cochlea such that the rate of deformation to its unrestrained state is sequenced with its rate of insertion so that the electrode array in general, or, more specifically, the intra-cochlea portion 188 thereof avoids contact with the lateral wall.

In an exemplary embodiment, the electrode array is inserted in a configuration such that it achieves a mid-scala insertion, which insertion is achieved by correlating the gradual deformation process due to the viscoelastic properties of the electrode array with insertion depth.

Corollary to the above is that in an exemplary embodiment, the electrode array is configured such that the more distal portions of the electrode array deform faster and/or deform at a different rate than the more lateral portions of the electrode array so as to better conform to the inner geometry of the cochlea. Thus, in an exemplary embodiment, the electrode array can be configured such that the rate of deformation from the unrestrained state is nonlinear with respect to location along the electrode array.

In an exemplary embodiment, the aforementioned deformation from the first geometry and/or third geometry to the second geometry occurs automatically upon release of restraint and/or relaxation of the restraint on the electrode array. Corollary to this is that in an exemplary embodiment, the action of the electrode array assembly achieving the second angular insertion depth relative to the first angular insertion depth occurs automatically. In an exemplary embodiment, the aforementioned automatic occurrences are a result of the viscoelastic properties of the portion of the first portion of the electrode array in general, and the intra-cochlea portions of the electrode array in particular.

It is noted that in some exemplary embodiments, the aforementioned changes from the first angular insertion depth to the second angular insertion depth are initiated and/or executed without external force relief, external pressure relief, reaction force, mass transfer and net energy transfer inducing the transformation from the first angular insertion depth to the second angular insertion depth.

In an exemplary embodiment, the first angular insertion depth corresponds to the geometry of the electrode array in the first geometry, and the second angular insertion depth corresponds to the geometry of the electrode array in the second geometry. Thus, any of the above-noted temporal features associated with the first and/or second geometries or any other feature associated therewith for that matter can also be applicable to the first angular insertion depth and the second angular insertion depth.

It is noted that while the embodiments detailed up until now have been directed towards scenarios where the angular insertion depth changes and/or the geometries change due to, for example, the elastomeric properties of the electrode array, it is noted that some other embodiments instead of, or in addition to this, also relate to a change in size/geometry of the electrode array relative to the radial direction. In this regard, in an exemplary embodiment, there is an implantable apparatus, comprising an electrode array including a main body carrying electrodes (e.g., electrode carrier 491), wherein the main body is configured to elastically expand in a radial direction relative to a longitudinal axis thereof (e.g., the longitudinal axis of the electrode array) after insertion into a recipient without any mass transfer into the portions of the main body that expanded. In this exemplary embodiment, the main body is configured such that the main body is expandable from a compressed diameter lying normal to the longitudinal axis, beginning at a time of full compression relief, to a diameter of at least 1.5 times the compressed diameter within a time period of no less than about 30 seconds from full compression relief In an exemplary embodiment, the main body is configured such that the main body is expandable from the compressed diameter lying normal to the longitudinal axis, beginning at a time of full compression relief, to a diameter of at least 1.5 times the compressed diameter within a time period of no less than about 20 seconds, 30 seconds, 40 seconds, 50 seconds, 60 seconds, 70 seconds, 80 seconds, 90 seconds, 2 minutes, 2.5 minutes, 3 minutes, 3.5 minutes, 4 minutes, 4.5 minutes, or 5 minutes or more or any value or range of values therebetween in one second increments.

Figure 13:
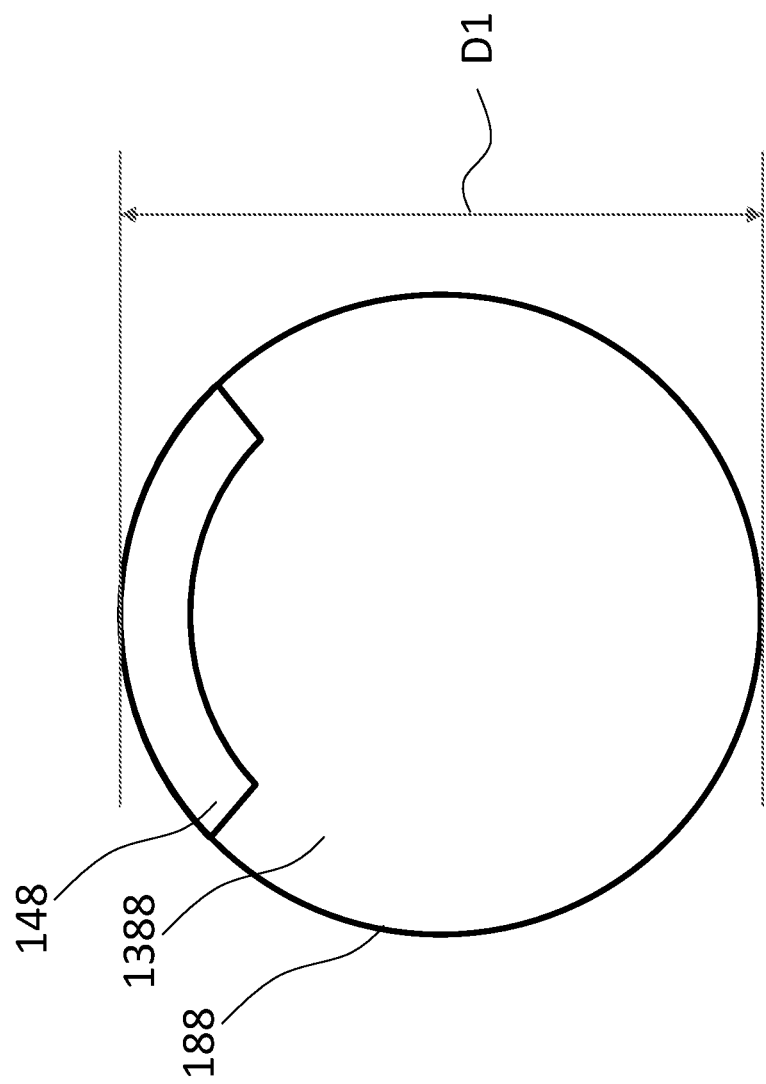
FIG. 13 is a cross-sectional view of another exemplary electrode array according to an exemplary embodiment.
Figure 14:
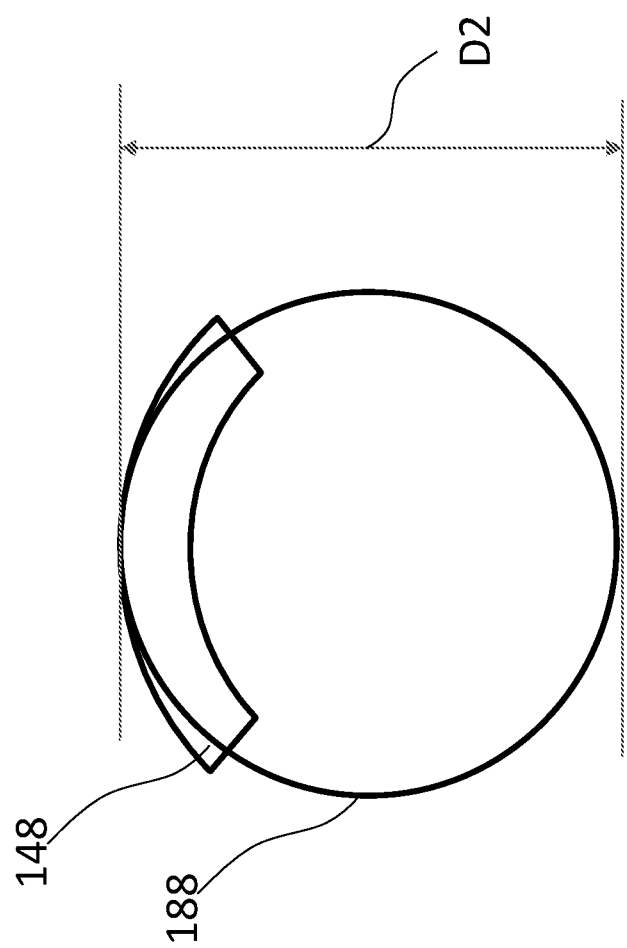
FIG. 14 is a cross-sectional view of the electrode array of FIG. 13 in a compressed state.

FIG. 13 depicts a cross-sectional view of an exemplary intra-cochlea portion 188 of an electrode array in a fully relaxed state, having a diameter D1 as can be seen. FIG. 14 depicts the exemplary intra-cochlea portion in a compressed state compressed such that D2 is about 66.67% of D1. Such compression can result from, for example, the compression that results from utilizing an insertion sheath or the like (more on this below). In an exemplary embodiment, the aforementioned temporal periods are required for D2 to return to D1.

It is noted that the embodiments of FIGS. 13 and 14 are presented for conceptual purposes. In this regard, while the embodiment of FIG. 14 is depicted as such where the main body pulls away from the side portions of the electrode 148 (which do not deform with the deformation of the main body), in alternative embodiments, the electrode array is configured such that the main body adheres to the side portions of the electrode array.

In an exemplary embodiment, the main body 1388 (the electrode carrier) is made of foam. In an exemplary embodiment, the main body 1388 is made of a viscoelastic material. Thus, in an exemplary embodiment, the main body is a viscoelastic foam. In at least some exemplary embodiments, a foam can enhance the viscoelastic properties relative to that which would be the case without foaming.

Figure 15:
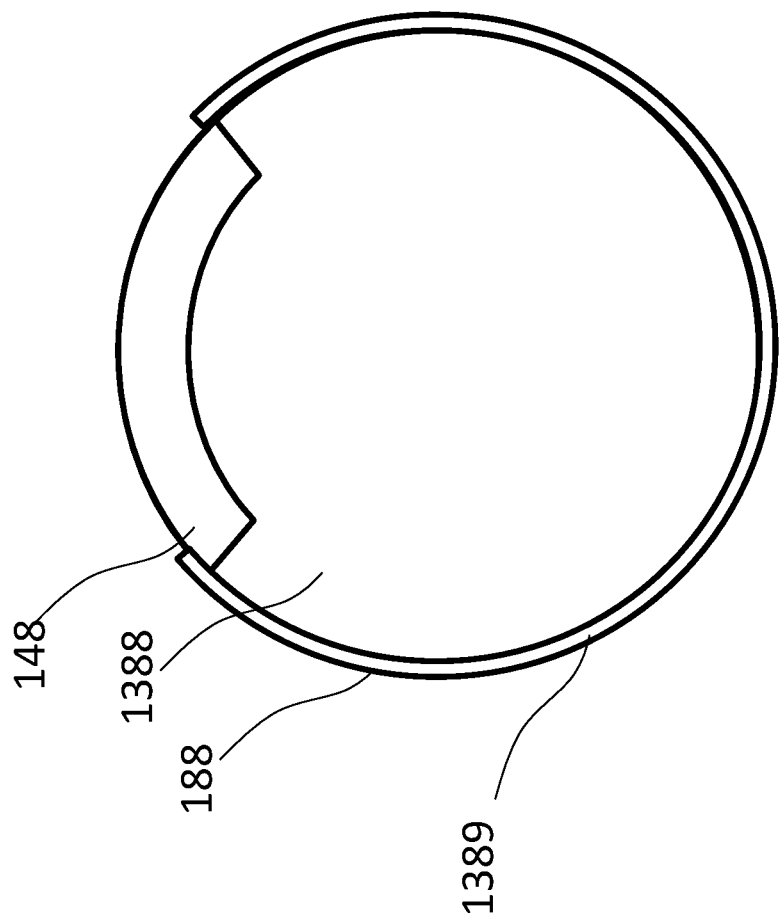
FIG. 15 is a cross-sectional view of another exemplary electrode array according to an exemplary embodiment.

It is noted that the aforementioned foam, viscoelastic or otherwise, can be used with respect to the embodiments of FIGS. 9 to 12. In an exemplary embodiment, the foam is akin to foam utilized in earplugs or the like. Indeed, in an exemplary embodiment, the foam corresponds to foam utilized in commercial grade earplugs. In an exemplary embodiment, the main body 1388 is covered or otherwise enclosed, at least in part, in an expandable skin 1389, as seen in FIG. 15. In this regard, the skin can cover the foam or otherwise protect the foam from body fluids or the like. In an exemplary embodiment, the skin can be made of soft silicone, which provides a smooth continuous outer surface of the electrode array.

In view of the above, it can be seen that in an exemplary embodiment, there is an electrode array in general, and an intra-cochlea portion in particular, made of a viscoelastic material that has a relatively slow recovery time with respect to recovery to its original form after deformation. By way of example only and not by way limitation, all other things being equal, with respect to the curved electrode arrays made out of non-viscoelastic silicon produced in 2015 by Cochlear LTD. under the trade name Contour Advance™ and Slim Modiolar™ at least some embodiments made out of the viscoelastic materials have a recovery time that is at least 2 times, 3 times, 4 times, 5 times, 6 times, 7 times, 8 times, 9 times, 10 times, 11 times, 12 times, 13 times, 14 times, 15 times, 16 times, 17 times, 18 times, 19 times, 20 times, 21 times, 22 times, 23 times, 24 times, 25 times, 26 times, 27 times, 28 times, 29 times, with 30 times or more slower than the aforementioned non-viscoelastic electrode array, with respect to recovering to at least 80%, 85%, 90%, 95%, or in some embodiments, 100% of the original form, after full relief of restraints on the electrode array.

It is noted that in an exemplary embodiment, an insertion tool, such as an insertion sheath, is utilized to place the electrode array into the aforementioned third geometry, which geometry can be substantially straight, including straight, or which geometry can be negatively curved, as detailed above. In embodiments where an insertion sheath is utilized, the insertion sheath can be utilized without placing the insertion sheath into the cochlea. Indeed, in an exemplary embodiment, with respect to the laterally expanding electrode array, the insertion sheath compresses the electrode array to a diameter smaller than that of its relaxed state, and, owing to the viscoelastic properties of the electrode array, the electrode array will remain at a reduced diameter relative to its relaxed diameter for sufficient period of time for the electrode array to be inserted into the cochlea after being unrestrained by the insertion sheath (e.g., after leaving the end of the insertion sheath/after being ejected from the end of the insertion sheath).

In at least some exemplary embodiments, the utilization of the viscoelastic material, foam material or otherwise, can enable the electrode array to conform to various sizes and/or shapes of the cochlea with minimal chronic contact pressure. In an exemplary embodiment, the viscoelastic material of the electrode array can be configured such that the outer circumference of the electrode array expands outward, pushing the outer circumference further away, with respect to the lateral direction, than the outer circumference of the electrodes, due to the expansion of the viscoelastic material from a compressed state. This will provide a "buffer" between the surface electrodes and the modiolus wall of the cochlea by the time the electrode array reaches the modiolus wall as a result of the transformation of the electrode array from the first geometry to the second geometry. Because the outer diameter of the electrode array can be compressed, the diameter of the cochleostomy or insertion opening into the round window, etc., can be smaller than that which would otherwise be required to accommodate the "full" diameter of the electrode array in its unrestrained state (or, more accurately, an electrode array having these features but which would expand to the unrestrained diameter much quicker than that which is the case according to some of the exemplary embodiments detailed herein).

Still further, in an exemplary embodiment, the electrode array can be configured so as to be a space-filling array. In an exemplary embodiment, the body (carrier) can be squashed down inside a sheath or the like (or in the aforementioned compression tool, etc.). Owing to its relatively slow expansion (relative to that which would be the case via the use of non-viscoelastic materials) the electrode array can be inserted into the cochlea at the compressed diameter, after which the electrode array expands so as to fill (or at least partially fill) the space within the cochlea, or at least the portion of the cochlea in the basal region. In an exemplary embodiment, the electrode array can expand so as to contact an interior wall of the cochlea, thereby "pushing" the electrodes towards the modiolus wall. In an exemplary embodiment, the electrode array can expand so as to contact the interior of the cochlea at one or more locations, thus providing a "brace" against movement.

In an exemplary embodiment, this space filling/bracing feature can reduce the amount of current loss relative to that which would be the case with an electrode array having a smaller diameter in the most expanded state. Still further, in an exemplary embodiment, this expanding feature can be utilized to provide mechanical fixation of the electrode array, thereby reducing the risk of migration relative to that which would be the case in the absence of this expansion.

In an exemplary embodiment, the space filling (including partially filling) nature of the electrode array displaces at least some of the perilymph fluid within the cochlea, thus reducing the current loss relative to that which would be the case if the fluid was not displaced.

In an exemplary embodiment, the viscoelastic material of which the carrier is made is the viscoelastic silicone of U.S. Patent Application Publication No. 20120329896, entitled Viscoelastic silicon rubber compositions, published by the USPTO on Dec. 27, 2012. In an exemplary embodiment, the viscoelastic material of which the carrier is made has one or more or all of the properties of one or more or all of the embodiments disclosed in U.S. Patent Application Publication No. 20120329896.

In an exemplary embodiment, there is an electrode array, comprising a plurality of electrodes; and an electrode carrier carrying the plurality of electrodes, wherein the electrode carrier includes a viscoelastic material. In an exemplary embodiment, there is an electrode array as describe above and/or below, wherein the electrode carrier is configured to recover to a curved, unrestrained and relaxed state, from a substantially straight state in no less than two minutes. In an exemplary embodiment, there is an electrode array as describe above and/or below, the electrode carrier is configured to recover to a curved, unrestrained and relaxed state, from a substantially straight state in no less than three minutes.

In an exemplary embodiment, there is a method, comprising obtaining a curved electrode array assembly, inserting a first portion of the electrode array assembly into a cochlea of a human in a deformed state that is deformed from a relaxed, unrestrained state of the electrode array assembly such that: (i) the first portion corresponds to a portion of the electrode array assembly extending a first distance of the electrode array assembly starting from a tip of the electrode array to a location proximal of the tip that is located in the cochlea; and (ii) the portion of the electrode array making up the first distance is inserted at a first angular insertion depth into the cochlea, wherein the first portion of the electrode array assembly achieves a second angular insertion depth greater than the first angular insertion depth after the first portion making up the first distance is located in the cochlea. In an exemplary embodiment, there is a method as detailed above and/or below, wherein the electrode array assembly achieving the second angular insertion depth occurs due to viscoelastic properties of the first portion. In an exemplary embodiment, there is a method as detailed above and/or below, wherein the action of inserting the first portion of the electrode array assembly into the cochlea entails inserting the portion such that it does not contact a lateral wall of the cochlea and does not contact a modiolus portion of the cochlea until after the electrode array assembly is inserted the first distance. In an exemplary embodiment, there is a method as detailed above and/or below, wherein the first distance is at least 16 mm.

In an exemplary embodiment, there is an implantable apparatus, comprising an electrode array including a main body carrying electrodes, wherein the main body is configured to elastically expand in a radial direction relative to a longitudinal axis thereof after insertion into a recipient without any mass transfer into the portions of the main body that expanded, wherein the main body is configured such that the main body is expandable from a compressed diameter lying normal to the longitudinal axis, beginning at a time of full compression relief, to a diameter of at least 1.5 times the compressed diameter within a time period of no less than about 30 seconds from full compression relief In an exemplary embodiment, there is an implantable apparatus as described above and/or below, wherein the main body is made of foam. In an exemplary embodiment, there is an implantable apparatus as described above and/or below, wherein the main body is made of a viscoelastic material. In an exemplary embodiment, there is an implantable apparatus as described above and/or below, wherein the main body is made of foam; and the foam is enclosed in an expandable skin.

In an exemplary embodiment, there is an implantable apparatus as described above and/or below, wherein the main body is configured such that the main body is expandable from the compressed diameter lying normal to the longitudinal axis, beginning at a time of full compression relief, to a diameter of at least 1.5 times the compressed diameter within a time period of no less than about one minute from full compression relief.

In an exemplary embodiment, there is an exemplary method, comprising obtaining a curved electrode array, accessing an interior of the cochlea, inserting the electrode array into the cochlea in a deformed state deformed from a relaxed, unrestrained, curved state, wherein at least a portion of the electrode array remains substantially in the same deformed state after entry into the cochlea. This exemplary method further includes surgically closing the surgical opening of the recipient after accessing the cochlea. This method is executed such that all components entering the cochlea after the action of accessing the interior of the cochlea remain in the cochlea after the action of surgically closing the surgical opening. In this regard, no stylet enters the cochlea (indeed, no stylet is used). It is noted that a stylet that is located entirely within the electrode array is still located in the cochlea if the portion of the array containing the stylet enters the cochlea. Still further, in this regard, no insertion sheath enters the cochlea. Still further, in this regard, there are no dissolvable materials that would dissolve into the fluid of the cochlea, which in turn would be dissolved into other portions of the body, thus leaving the cochlea.

It is noted that some and/or all of the teachings detailed herein can be used with a hearing prosthesis, such as a cochlear implant. That said, while the embodiments detailed herein have been directed towards cochlear implants, other embodiments can be directed towards application in other types of hearing prostheses, such as by way of example, other types of electrode arrays used in medical devices (e.g., pacemakers, nerve stimulators, deep brain stimulators etc.). Indeed, embodiments can be utilized with any type of medical device that utilizes an implanted electrode array, or even a non-implanted array. Still further, the teachings detailed herein are not limited to electrode arrays, but can be utilized with any implant providing that the teachings detailed herein and/or variations thereof have utilitarian value.

It is noted that any disclosure with respect to one or more embodiments detailed herein can be practiced in combination with any other disclosure with respect to one or more other embodiments detailed herein.

It is noted that some embodiments include a method of utilizing the apparatuses and systems that have one or more or all of the teachings detailed herein and/or variations thereof. In this regard, it is noted that any disclosure of a device and/or system herein also corresponds to a disclosure of utilizing the device and/or system detailed herein, at least in a manner to exploit the functionality thereof. Further, it is noted that any disclosure of a method of manufacturing corresponds to a disclosure of a device and/or system resulting from that method of manufacturing. It is also noted that any disclosure of a device and/or system herein corresponds to a disclosure of manufacturing that device and/or system. Moreover, any disclosure of a method action herein also corresponds to a system and/or a device for executing that method action. Also, any disclosure of a device and/or system herein corresponds to a disclosure of a method of using that device and/or system, and a method of manipulating that device and/or system using the features disclosed herein.

While various embodiments have been described above, it should be understood that they have been presented by way of example only, and not limitation. It will be apparent to persons skilled in the relevant art that various changes in form and detail can be made therein without departing from the spirit and scope of the invention. Thus, the breadth and scope of the present invention should not be limited by any of the above-described exemplary embodiments, but should be defined only in accordance with the following claims and their equivalents.

What is claimed is:

1. An electrode array, comprising:
   a plurality of electrodes; and
   an electrode carrier carrying the plurality of electrodes, wherein
   the electrode carrier includes a viscoelastic material, and
   the electrode carrier is configured to transform from a first geometry having a first average radius of curvature to a second geometry having a second average radius of curvature smaller than the first average radius of curvature in the absence of at least four of the following: (i) external force relief inducing and establishing the transformation; (ii) external pressure relief inducing and establishing the transformation; (iii) reaction force inducing and establishing the transformation; (iv) mass transfer inducing and establishing the transformation; (v) net energy transfer inducing and establishing the transformation.

2. The electrode array of claim 1, wherein:
   the electrode carrier is made of a viscoelastic material.

3. The electrode array of claim 2, wherein:
   the electrode carrier is configured to recover to a curved, unrestrained and relaxed state, from a substantially straight state in no less than one minute.

4. The electrode carrier of claim 1, wherein:
   the electrode carrier is made of viscoelastic silicone; and
   the electrode carrier is devoid of non-viscoelastic silicone.

5. The electrode array of claim 1, wherein:
   the electrode array is a styletless array, and wherein the viscoelastic material is a biocompatible viscoelastic material.

6. The electrode array of claim 5, wherein:
the electrode array is a cochlear implant electrode array configured to be implanted in a cochlea of a human to evoke a hearing percept based on a plurality of different and distinct frequency band channels.

7. The electrode array of claim 5, wherein:
the electrode carrier also includes non-viscoelastic silicone.

8. The electrode carrier of claim 5, wherein:
the electrode carrier is made of viscoelastic silicone; and
the electrode carrier is devoid of non-viscoelastic silicone.

9. The electrode array of claim 1, wherein:
the electrode carrier is made of the viscoelastic material and a non-viscoelastic material, the viscoelastic material being located in a plurality of discrete bodies located along a length of the carrier, the plurality of discrete bodies being separated by respective bodies of non-viscoelastic material.

10. An electrode array, comprising:
a plurality of electrodes; and
an electrode carrier carrying the plurality of electrodes, wherein
the electrode carrier includes a viscoelastic material, and
the electrode carrier is not made of viscoelastic silicone.

11. The electrode array of claim 10, wherein:
the electrode carrier is configured to recover to a curved, unrestrained and relaxed state, from a substantially straight state in no less than 30 seconds.

12. The electrode array of claim 11, wherein:
the electrode carrier is configured to recover to the curved, unrestrained and relaxed state, from the substantially straight state without external force relief, external pressure relief, reaction force, mass transfer and net energy transfer inducing and/or establishing the recovery to the curved, unrestrained and relaxed state, from the substantially straight state.

13. The electrode array of claim 11, wherein:
the electrode carrier is configured to recover to the curved, unrestrained and relaxed state, from the substantially straight state without moving any component relative to the electrode array that initiates or results in the recovery to the curved, unrestrained and relaxed state, from the substantially straight state.

14. The electrode array of claim 11, wherein:
the electrode carrier is configured to recover to the curved, unrestrained and relaxed state, from the substantially straight state without moving any component relative to the electrode array that initiates or results in the recovery to the curved, unrestrained and relaxed state, from the substantially straight state; and
the electrode array is a styletless electrode array; and
the electrode array is in a sterilely sealed package.

15. The electrode array of claim 11, wherein:
the electrode carrier is configured to recover to the curved, unrestrained and relaxed state, from the substantially straight state by moving a component relative to the electrode array so as to initiate in the recovery to the curved, unrestrained and relaxed state, from the substantially straight state;
the electrode array is a styleted electrode array; and
the component that is moved is a stylet.

16. The electrode array of claim 11, wherein:
the electrode carrier is configured to recover to the curved, unrestrained and relaxed state, from the substantially straight state with external force relief, external pressure relief, reaction force, mass transfer or net energy transfer inducing and/or establishing the recovery to the curved, unrestrained and relaxed state, from the substantially straight state.

17. The electrode array of claim 10, wherein:
the electrode carrier is configured to transform from a first geometry having a first average radius of curvature to a second geometry having a second average radius of curvature different than the first average radius of curvature, the electrode carrier is configured so that the transformation from the first geometry to the second geometry is entirely a result of an elastic material devoid of metal, the elastic material including the viscoelastic material.

18. The electrode array of claim 17, wherein:
the electrode carrier is configured to transform from the first geometry to the second geometry in the absence of all five of the following: (i) external force relief inducing and establishing the transformation; (ii) external pressure relief inducing and establishing the transformation; (iii) reaction force inducing and establishing the transformation; (iv) mass transfer inducing and establishing the transformation; (v) net energy transfer inducing and establishing the transformation.

19. The electrode array of claim 17, wherein:
the electrode array includes a plurality of leads, the plurality of leads being in the electrode carrier.

20. The electrode array of of claim 10, wherein:
the electrode carrier is configured to transform from a first geometry having a first average radius of curvature to a second geometry having a second average radius of curvature smaller than the first average radius of curvature in the absence of at least four of the following:
(i) external force relief inducing and establishing the transformation; (ii) external pressure relief inducing and establishing the transformation; (iii) reaction force inducing and establishing the transformation; (iv) mass transfer inducing and establishing the transformation; (v) net energy transfer inducing and establishing the transformation.

21. An electrode array, comprising:
a plurality of electrodes; and
an electrode carrier carrying the plurality of electrodes, wherein
the electrode carrier includes a viscoelastic material,
the electrode carrier is made of the viscoelastic material and a non-viscoelastic material, the viscoelastic material being located in a plurality of discrete bodies located along a length of the carrier, the plurality of discrete bodies being separated by respective bodies of non-viscoelastic material, and
the non-viscoelastic material is an elastic material.

22. The electrode array of claim 21, wherein:
the electrode carrier is configured to transform from a first geometry having a first average radius of curvature to a second geometry having a second average radius of curvature smaller than the first average radius of curvature due to none of external force relief, external pressure relief, reaction force, mass transfer and net energy transfer inducing and establishing the transformation.

23. The electrode array of claim 21, wherein:
the array is a cochlear implant electrode array, and the array is configured such that after insertion into a cochlea, the array automatically moves from a first geometry that is a curved geometry to a second geometry that is a curved geometry having an average radius of curvature that is lower than that of the first geometry, wherein the array is configured to hug a modiolus wall of a cochlea in its relaxed state when inserted into a cochlea, the relaxed state having the second geometry.

24. An electrode array, comprising:

a plurality of electrodes; and an electrode carrier carrying the plurality of electrodes, wherein the electrode carrier includes a viscoelastic material, the electrode carrier is configured to transform from a first geometry having a first average radius of curvature to a second geometry having a second average radius of curvature different than the first average radius of curvature, the electrode carrier is configured so that the transformation from the first geometry to the second geometry is entirely a result of an elastic material devoid of metal, the elastic material including the viscoelastic material, the electrode carrier is configured to transform from the first geometry to the second geometry without external force relief, the electrode carrier is configured to transform from the first geometry to the second geometry without external pressure relief inducing and establishing the transformation, the electrode carrier is configured to transform from the first geometry to the second geometry without reaction force inducing and establishing the transformation, the electrode carrier is configured to transform from the first geometry to the second geometry without mass transfer inducing and establishing the transformation; transformation, the electrode carrier is configured to transform from the first geometry to the second geometry without net energy transfer inducing and establishing the transformation.

* * * * *